(12) United States Patent
Barrera et al.

(10) Patent No.: US 10,273,347 B2
(45) Date of Patent: Apr. 30, 2019

(54) NANO-(MULTIFUNCTIONAL) SOLUTIONS FOR GLASS AND GLASS PRODUCTS: HETEROGENEOUS NANO-SELF-ASSEMBLY AND/OR COATING

(71) Applicant: C-Bond Systems, LLC, Houston, TX (US)

(72) Inventors: Enrique V. Barrera, Houston, TX (US); Liehui Ge, Houston, TX (US); Santoshkumar Biradar, Houston, TX (US); Paul H. Brogan, The Woodlands, TX (US); Bruce E. Rich, Houston, TX (US)

(73) Assignee: C-Bond Systems, LLC, Houston, TX (US)

( * ) Notice: Subject to any disclaimer, the term of this patent is extended or adjusted under 35 U.S.C. 154(b) by 406 days.

(21) Appl. No.: 14/825,139

(22) Filed: Aug. 12, 2015

(65) Prior Publication Data
US 2016/0046823 A1 Feb. 18, 2016

Related U.S. Application Data

(63) Continuation-in-part of application No. PCT/IB2014/065690, filed on Oct. 29, 2014.

(60) Provisional application No. 62/036,241, filed on Aug. 12, 2014, provisional application No. 61/962,064, filed on Oct. 30, 2013, provisional application No. 62/121,204, filed on Feb. 26, 2015, provisional application No. 62/186,317, filed on Jun. 29, 2015, provisional application No. 62/187,243, filed on Jul. 1, 2015.

(51) Int. Cl.
*C08K 5/42* (2006.01)
*C08K 5/053* (2006.01)
*C09D 133/06* (2006.01)
*C09D 201/00* (2006.01)

(52) U.S. Cl.
CPC ............... *C08K 5/053* (2013.01); *C08K 5/42* (2013.01); *C09D 133/06* (2013.01); *C09D 201/00* (2013.01); *C08L 2312/08* (2013.01)

(58) Field of Classification Search
CPC ........ C08K 5/42; C08K 5/053; C09D 133/06; C09D 201/00; C08L 2312/08
USPC ........................................................ 524/161
See application file for complete search history.

(56) References Cited

U.S. PATENT DOCUMENTS 6,485,838 B1 * 11/2002 Shimada ................. C03C 17/30
428/33

FOREIGN PATENT DOCUMENTS

WO  WO-2013009691 A1 * 1/2013 ............. C03C 17/30

* cited by examiner

*Primary Examiner* — Angela C Scott
(74) *Attorney, Agent, or Firm* — Stroock & Stroock & Lavan LLP

(57) ABSTRACT

The present invention relates generally to the reinforcement, repair, and strengthening of materials through the application of innovative, nanoparticle-based compositions to substrate materials, including but not limited to glass and ceramic. In some embodiments, the present invention produces a strengthened laminate. The compositions of this invention accomplish such ends by employing nanoparticles and use other components that work with the nanoparticles to enable advanced multifunctional properties in treated materials. This invention also enhances the initial tack and adhesion properties of materials to polymer coatings, materials to film, materials to other materials, and film to film. At least one embodiment concerns an improved process for making the compositions.

22 Claims, 26 Drawing Sheets

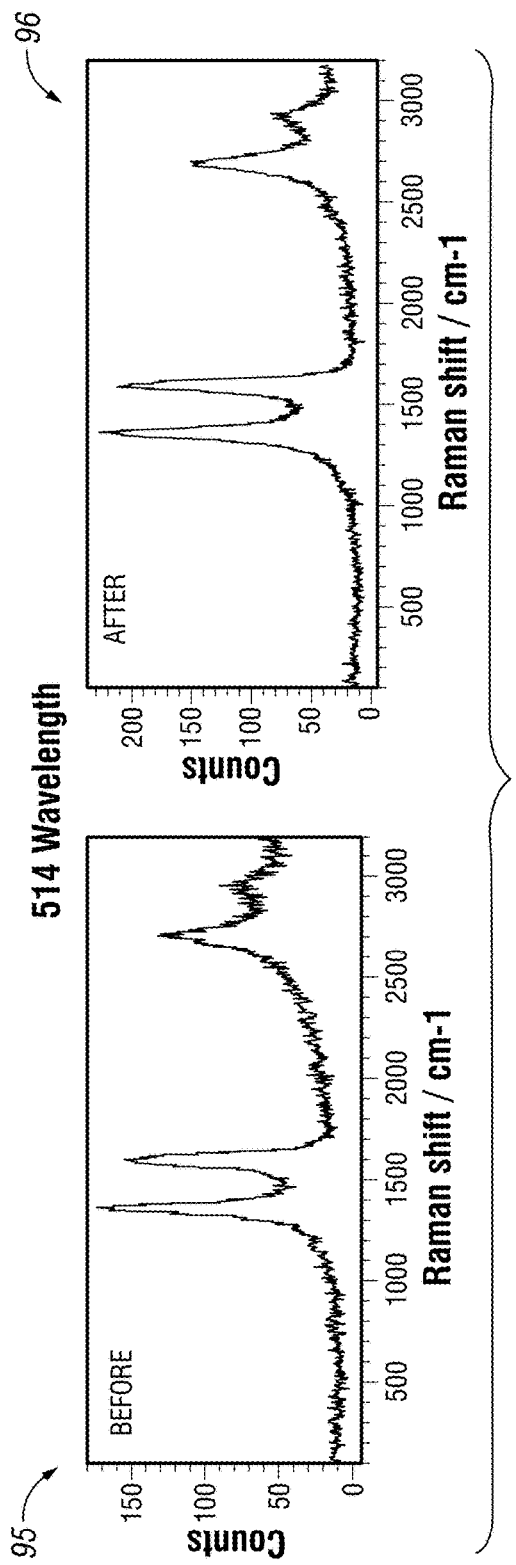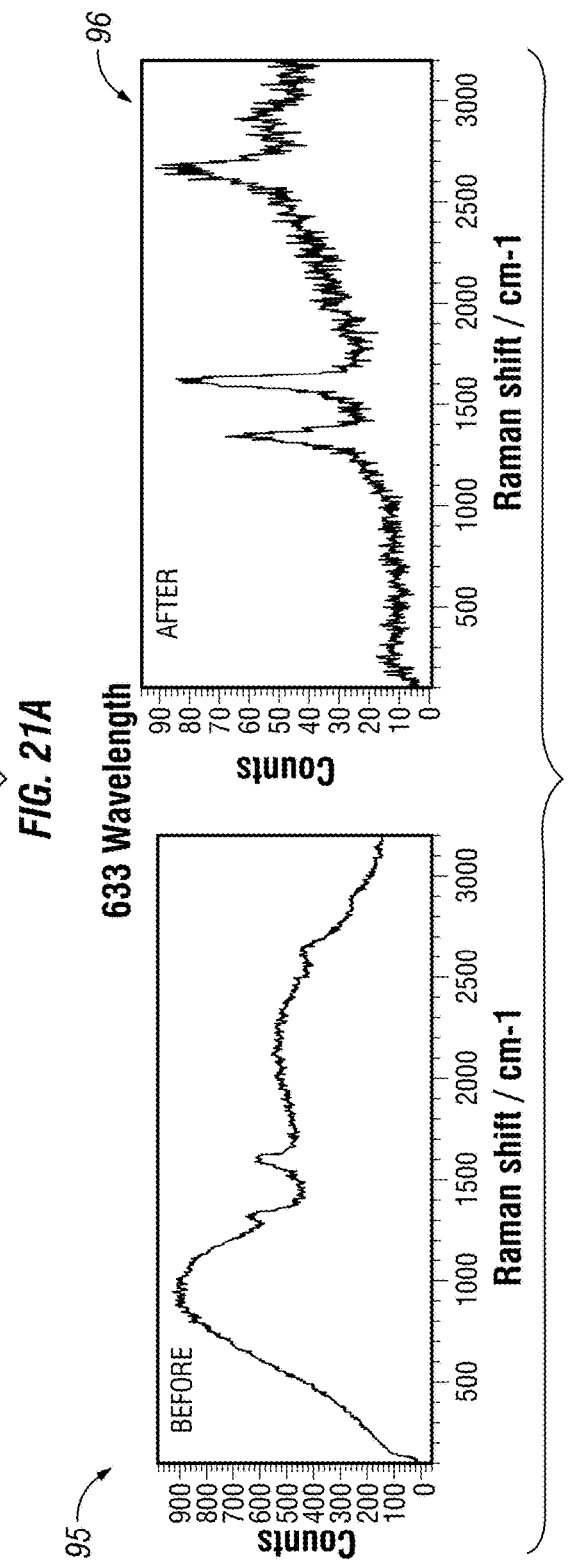
FIG. 21A
FIG. 21B

NANO-(MULTIFUNCTIONAL) SOLUTIONS FOR GLASS AND GLASS PRODUCTS: HETEROGENEOUS NANO-SELF-ASSEMBLY AND/OR COATING

CROSS-REFERENCE TO RELATED APPLICATION

This application is a Continuation-in-Part of International Application No. PCT/IB2014/065690, filed on Oct. 29, 2014, which claims priority to and the benefit of U.S. Provisional Application No. 61/962,064, filed on Oct. 30, 2013. This application claims priority to and the benefit of U.S. Provisional Application Nos. 62/036,241, filed on Aug. 12, 2014, 62/121,204, filed on Feb. 26, 2015, 62/186,317, filed on Jun. 29, 2015, and 62/187,243, filed on Jul. 1, 2015.

FIELD OF INVENTION

The present invention relates generally to the reinforcement, repair, and strengthening of materials through the application of innovative, nanoparticle-based compositions to substrate materials, including but not limited to glass. In some embodiments, the present invention produces a strengthened laminate. The compositions of this invention accomplish such ends by employing nanoparticles and use other components that work with the nanoparticles to enable advanced multifunctional properties in treated materials. This invention also enhances the initial tack and adhesion properties of materials to polymer coatings, materials to film, materials to other materials, and film to film. One embodiment concerns an improved process for making the compositions.

BACKGROUND OF THE INVENTION

Glass, glass/film systems, glass/polymer systems and other materials that have surface flaws that are either an artifact of the manufacturing process or caused by external forces can undergo premature failure because the flaws lead to cracking and because these materials possess resistance to fracture. Such materials include glass, light bulbs, cement, ceramics, fingernail and toenails, paints, transparent polymers and other polymers.

Current methods for strengthening glass include the following: (1) changing the composition of the glass, (2) changing the manufacturing process for glass, (3) making the glass thinner, (4) using mechanical, chemical or laser etching methods to polish the glass, or (5) putting a coating on the glass. These methods tend to be expensive.

The compositions claimed by the embodiments of this invention have the property of finding heterogeneous sites on the surface and edges of the material substrates and healing the flaws through localized self-assembly of the nanoparticles working with the ingredients in the compositions. The novel approaches disclosed and claimed also achieve other, multifunctional outcomes.

This invention is a continuation-in-part of PCT Application Serial No. PCT/IB2014/065690, "Improved Materials, Treatment Compositions, and Material Laminates, with Carbon Nanotubes" and unlocks the science of strengthening materials, including but not limited to glass, without the need for a continuous coating, and creating strengthened laminates.

BRIEF DESCRIPTION OF THE INVENTION

Nanoscale particles of several types are integrated into a solution that can be applied to glass, ceramic, film and a wide range of other products for strengthening, reinforcement, repair, cleaning and to provide other multifunctional properties. The solutions are sprayed on as a coating or to leave a dispersion of active ingredients that interact with the surface and/or defects on the surface to strengthen the substrate without necessarily coating the entire surface. In some embodiments a monolayer coating is applied.

At least one embodiment combines a liquid, hygroscopic lubricant, a coupling agent, a solvent, one or more surfactants that serve as modifiers for wetting and improved capillary action, a binder and nanoparticles dispersed throughout the composition. This composition interacts with substrate through the self-assembly of its constituent ingredients and nanoparticles around heterogeneous sites along the substrate's surface and edges.

In embodiments, the nanoparticles include but are not limited to: carbon nanotubes of all types (including single-walled carbon nanotubes (SWNT), double-walled carbon nanotubes (DWNT), multi-walled carbon nanotubes (MWNT) and XDCNT (a mixture of various carbon nanotube types), boron nitride nanotubes, graphene, graphene oxide, graphene as flakes or ribbons, 2-D nanoparticles, hexagonal boron nitride as flakes or ribbons, calcium carbonate, boron-silicate, alumina, silica, Polyhedral Oligomeric Silsesquioxane (POSS), nanoclays and other ceramic and inorganic nanoparticles and other nano-scale modifiers. Ceramic nanoparticles may also be Color Centers or F-Center materials on a nano-to micro-scale that enable color change. Some embodiments include a mixture of nanoparticles in the composition to promote synergistic behavior of the constituents.

In embodiments, chemical and thermal treatment and functionalization of nanoparticles further enable the nanoparticles to interact with substrates such as glass, plastic film that gets attached to glass or the pressure sensitive adhesive (PSA) that is attached to the film.

Embodiments include surfactants and other additives that assist in dispersing the nanoparticles, keeping them dispersed in a solution and linking them to glass when they are applied. Surfactants are added particularly if the base liquid is water soluble as well as with embodiments not based on water such as alcohols and other solvents.

Polymer additives or glass additives (via sol gel which may also be a water based solution) can be added to adjust strength and offer alternatives to a fully water based solutions. Some embodiments include polyurethanes and polyurea. Other polymer adhesives including epoxies can also be used. Other polymers can include polycarbonate, poly (methyl methacrylate) polymer (PMMA), acrylonitrile butadiene styrene polymer (ABS), cellulose acetate butyrate, acrylic polymer, and glycol modified polyethylene terephthalate (PET).

Some embodiments do include a coupling agent but some do not. Coupling agents facilitate the bonding of nanoparticles to additives, to glass and/or to polymers. Some embodiments do not include a polymer. Some embodiments include a polymer as a method of toughening and bonding to the plastic film that is sometimes applied. In the cases where a plastic film is not being installed, some embodiments of the composition will not include a polymer but may include a coupling agent.

At least one embodiment includes defoamers for reduction in foaming, surface cleaners (in some cases, multiple surfactants), and UV blockers for UV reduction. Embodiments can be applied as a regular, fast drying or fast curing composition.

These embodiments can be used for the following market segments and application areas: glass, light bulbs of all types, cement and concrete, ceramics, fine china, stained glass windows, finger- and toenail polish, paints, transparent polymers and other polymers. Other market segments and applications include but are not limited to: storm glass, vehicle and building windows, glass protection systems, eyeglasses, gorilla glass, glass desk and table tops, shower glass, glass on cell phones, glass art, ceramic art, porcelain and ceramic products, and glass structures and mechanical structures. Ceramic products can include stoneware, earthenware, and pottery. Applications can include ceramic radomes, ceramics thin films and ceramic containing devices.

Embodiments can clean glass, alter the color or tint of glass without reducing its clarity, reduce glass roughness to the nanoscale, when applied with plastic film to glass, improve strength, tack and adhesion, improve protection against thermal insults, enhance film bonding, and provide noise reduction and UV protection. The embodiments of the composition can increase the tackiness of PSA products on film in their bonding to glass and/or polymer systems.

The embodiments of this invention combine a broad range of constituent components including different nanoparticle types, as well as enabling the use of mixtures of different nanoparticle types, different coupling agents and mixtures of coupling agents and different polymer binders, as well as mixtures of polymer binders. The use of polyurethanes and polyurea allows laminate made with the composition to be made tough, strong, rubbery, or rigid depending on the chemistry of the polyurethane used. Other polymer additives can perform in the same way. The concentration of the polymer additives can lead to coloration of the glass or provide a smoky finish for some applications (including shower glass). The sol gel ingredients allow compositions that do not require a polymer or may also be used with a polymer or can be applied at high temperatures.

BRIEF DESCRIPTION OF THE DRAWINGS

FIG. 21A illustrates the Raman spectra of carbon nanotubes in Example 18 before and after surface modification.

FIG. 21B illustrates the Raman spectra of carbon nanotubes in Example 18 before and after surface modification.

DETAILED DESCRIPTION OF THE INVENTION

Figure 1:
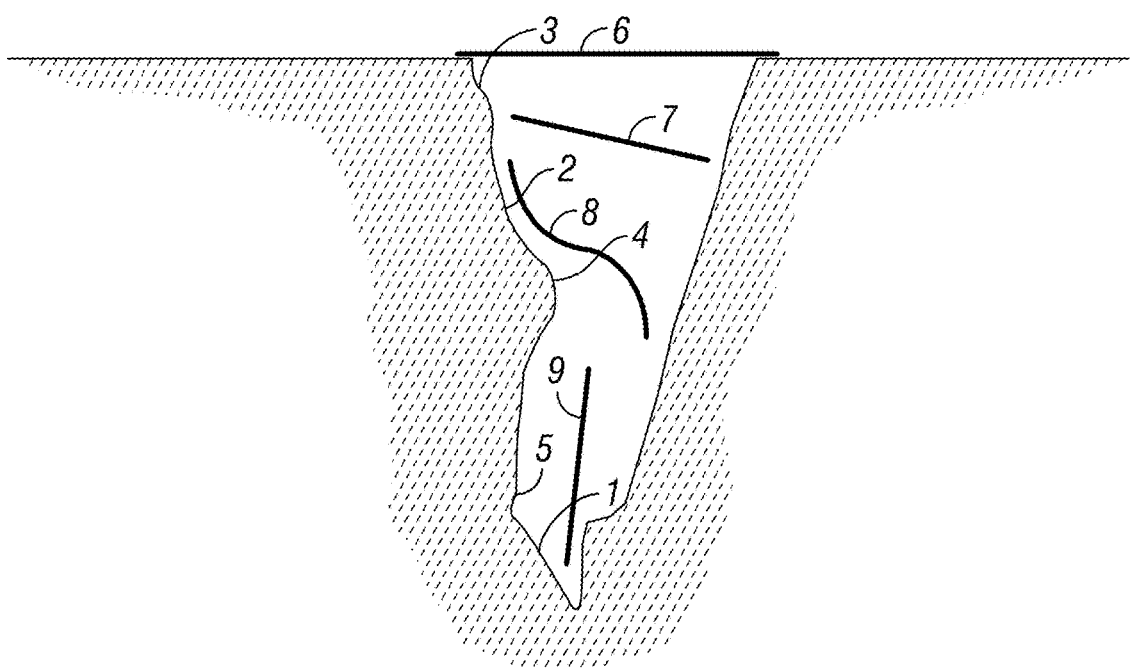
FIG. 1 is a cross sectional view of a crack or flaw in a material substrate and the different mechanisms by which embodiments of this invention repair and reinforce the material substrate.

At least one embodiment of the composition contains ingredients in the following proportions by volume percent of the composition:

Base or Carrier Liquid (water or other solvent): 90-99.99% by volume percent

Hygroscopic lubricant or preservative (humectant): 0.001-10% by volume percent
   Coupling agent(s): 0.001-10% by volume percent
   Solvent(s): 0.001-10% by volume percent
   Surfactant(s): 0.001-5% by volume percent
   Binder(s): 0.001-5% by volume percent
   Nanoparticle(s): 0.00001-5% by volume percent In embodiments where the nanoparticles have been chemically treated, thermally treated or both and functionalized, the chemicals used to treat the nanoparticles are 0.001-20% by weight percent of the nanoparticles in the composition. In a given embodiment, each of these ingredients (base or carrier liquid, hygroscopic lubricant or preservative, coupling agent, solvent, surfactant, binder, nanoparticles) can be of a single type or a mix of types.

In at least one embodiment, the composition can be prepared as follows:

Part A
1. Slowly add base liquid (water or solvent) with designated amount of hygroscopic lubricant (humectant);
2. Add designated amount of coupling agent to the solution and mix;
3. Wait 8 to 24 hours, then add designated amount of solvent to the solution and mix;
4. Add designated amount of surfactant to the solution and mix;

Part B
5. Functionalize the nanoparticles (typically involving among other steps chemical and/heat treatment) or use without first functionalizing so that they are allowed to functionalize within the solution;
6. Add designated amount of nanoparticles to the solution and mix;
7. Decant the solution when needed;
8. Add designated amount of binder to the solution and mix.

In some embodiments, the base liquid includes, for example, distilled water, non-distilled water, de-ionized water, drinking water, spring water, or tap water. Some embodiments use non-aqueous base liquids such as methanol, ethanol and isopropyl alcohol.

In some embodiments, the hygroscopic lubricant or preservative includes, for example, glycerol, glycols, and polyol.

In some embodiments, the coupling agent includes, for example, silanes, organosilanes, phosphonates, and 3-glycidyloxypropyltrimethoxysilane.

In some embodiments, the solvent includes, for example, alcohols (including isopropyl alcohol), toluene, hexane and dimethylformamide.

In some embodiments, the surfactant includes, for example, anionic surfactants, cationic surfactants, ampholytic surfactants, non-ionic surfactants, alkylsulfuric acid surfactants of 10 to 14 carbon atoms (such as alkyl sulfates), dodecanesulfonic acid, dodecanoylsarcosine, dodecanoic acid, cholic acid, salts thereof, for example, such as sodium salts, sodium dodecylsulfate, sodium decylsulfate, sodium dodecyl-benzenesulfonate, sodium tetradecylsulfate, n-dodecylphosphocholinesodium dodecylbenzenesulfonate (SDBS), DOW ZONYL FSH or FSJ.

In some embodiments, the binder includes, for example, polymers, acrylic emulsion, vinyl acetate monomer, polyvinyl acetate, acrylic polymer, polyurethane, polyurea, polycarbonate, poly(methyl methacrylate) (PMMA), acrylonitrile butadiene styrene (ABS) polymer, cellulose acetate butyrate, acrylic and glycol modified polyethylene terephthalate (PET), epoxide and glass or silica additives in sol gel.

In some embodiments, the nanoparticles include, for example, single-walled carbon nanotubes (SWCNTs), double-walled carbon nanotubes (DWCNTs), multi-walled carbon nanotubes (MWCNTs), XDCNT (a mixture of different carbon nanotube types), boron nitride nanotubes, graphene oxide, graphene as flakes or ribbons, hexagonal boron nitride as flakes or ribbons, calcium carbonate, alumina, silica, Polyhedral Oligomeric Silsesquioxane (POSS), nanoclays, ceramic nanoparticles made of Color Centers or F-Center materials and other ceramic and inorganic nanoparticles.

In some embodiments, nanoparticles are treated with one, some, or all of the following: heat, acid (e.g. sulfuric acid, nitric acid) and peroxide. Some embodiments include nanoparticles that have been functionalized.

Including additional ingredients in some embodiments creates a composition that provides multifunctional properties to glass. Such additional ingredients include, for example, UV blockers, cleaners (e.g. soaps, bleach, ammonia, detergents, surfactants, de-greasing agents, acetic acid, baking soda, or other ingredients found in cleaners), ingredients that affect color (e.g. dye), and defoamers. Those embodiments that clean while strengthening substitute in part water-based cleaning products for water in the carrier liquid. The strength of the cleaning component is dependent on the application. Those compositions that isolate defects contain a lower concentration of ingredients while those that serve as a coating include a higher concentration of ingredients.

Other ingredients that are added are either active or masking components for better commercial use. Ingredients that work best with films include, for example, slip agents (e.g. surfactant and hygroscopic lubricant), defoamers, and adherent agents (e.g. coupling agent, binder and nanoparticles). Masking agents are added so that properties of the solution are not reduced. One of the critical factors in mixing is component concentration.

For standalone glass strengthening applications, embodiments of the composition can work without one or more of the disclosed ingredients (base or carrier liquid, hygroscopic lubricant or preservative, coupling agent, solvent, surfactant, binder, nanoparticles). In some embodiments, the composition has an alternative solvent as the carrier liquid instead of water. In some embodiments, the composition does not have hygroscopic lubricant (e.g. glycerol). In some embodiments, the composition does not have solvent (e.g. isopropyl alcohol). In some embodiments, the composition does not have surfactant (e.g. SDBS). In some embodiments, when the nanoparticles are functionalized before being added, the composition does not have coupling agent. In some embodiments, when the nanoparticles are functionalized before being added, the composition does not have binder. In some embodiments, when nanoparticles are functionalized before being added, the composition does not have coupling agent and binder. In some embodiments, when the nanoparticles are functionalized before being added, the composition does not have coupling agent, surfactant and binder.

A sol-gel process, involving gelation of a starting solution applied on glass surface, can be employed to form silica in flaws or to deposit a homogeneous and crack-free silica film that cures and repairs flaws and in turn strengthens glass, ceramic and other materials. Alkoxides, such as silicon tetraethyl orthosilicate Si (OC$_2$H$_5$)$_4$, or Si(OR)$_4$ (TEOS), are chemical precursors that react readily with water (hydrolysis). A hydroxyl group is attached to the silicon as follows:

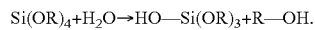

Hydrolysis may proceed to completion to form silica:

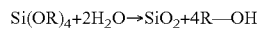

When this process occurs in a flaw, it can strengthen glass through healing. A homogeneous and crack-free silica film can also be deposited to cure and repair the flaw and in turn strengthen glass.

Embodiments of the composition work with one or a plurality of layers of many substrates including, for example, glass, film, ceramic, pressure sensitive adhesive (PSA), LEXAN (trademark) material, cement and concrete, fine china, stained glass windows, finger- and toenail polish, paints, transparent polymers, polycarbonate material, acrylic material and other polymers.

The composition can be applied at room temperature or at elevated temperatures or can be fixed in their final properties at elevated temperatures. In some embodiments the composition can be applied at low temperatures above freezing.

Solutions are prepared by mixing required ingredients using mixing on one or more scales. The composition is applied to substrate by spraying, soaking or using an applicator. The composition can be applied in more than one stage with the first application serving either as a local application or as a coating and the second and/or third component(s) serving as a local application and/or coating and also as a sealing agent.

In at least one embodiment (hereinafter referred to as Example 1), the composition is prepared using the method described in Part A and Part B above with the following components: 90-99.99% by volume percent water as the carrier liquid, 0.001-10% by volume percent glycerol hygroscopic lubricant and preservative, 0.001-10% by volume percent 3-glycidyloxypropyltrimethoxysilane as the coupling agent, 0.001-10% by volume percent isopropyl alcohol as the solvent, 0.001-10% by volume percent sodium dodecylbenzenesulfonate (SDBS) as the surfactant, 0.001-5% by volume percent acrylic emulsion (Rhoplex EC-1791) as binder and 0.00001-5% by volume percent multi-walled carbon nanotubes (commercially available from Southwest NanoTechnologies) for the nanoparticles. The composition of Example 1, excluding nanoparticles, is hereinafter referred to as the Base Solution. The composition of Example 1 excluding binder and MWCNT is hereinafter referred to as Part A Solution.

Figure 2A:
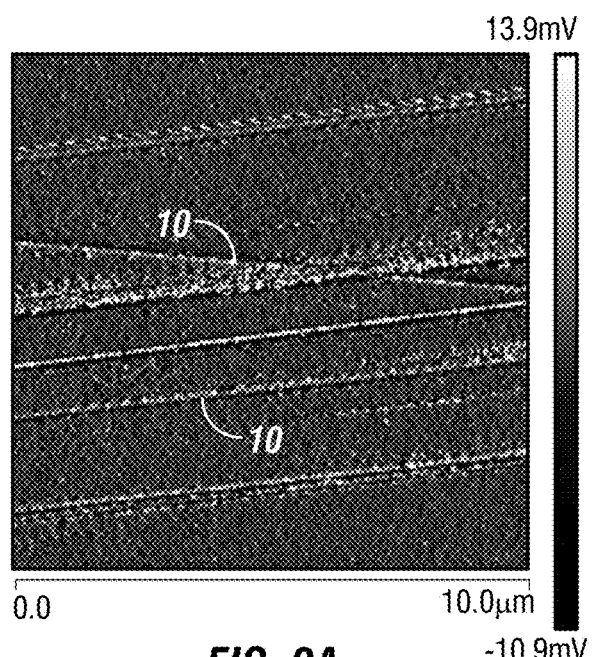
FIG. 2A is an atomic force microscopic (AFM) image of a glass surface showing areas with no flaws and other areas places where a variety of defects are shown.
Figure 2B:
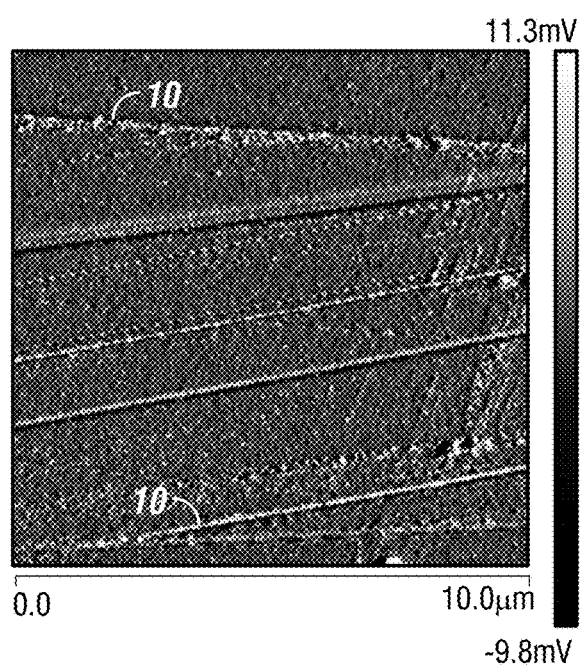
FIG. 2B is an atomic force microscopic (AFM) image of a glass surface at showing areas with no flaws and other areas places where a variety of defects are shown.
Figure 3:
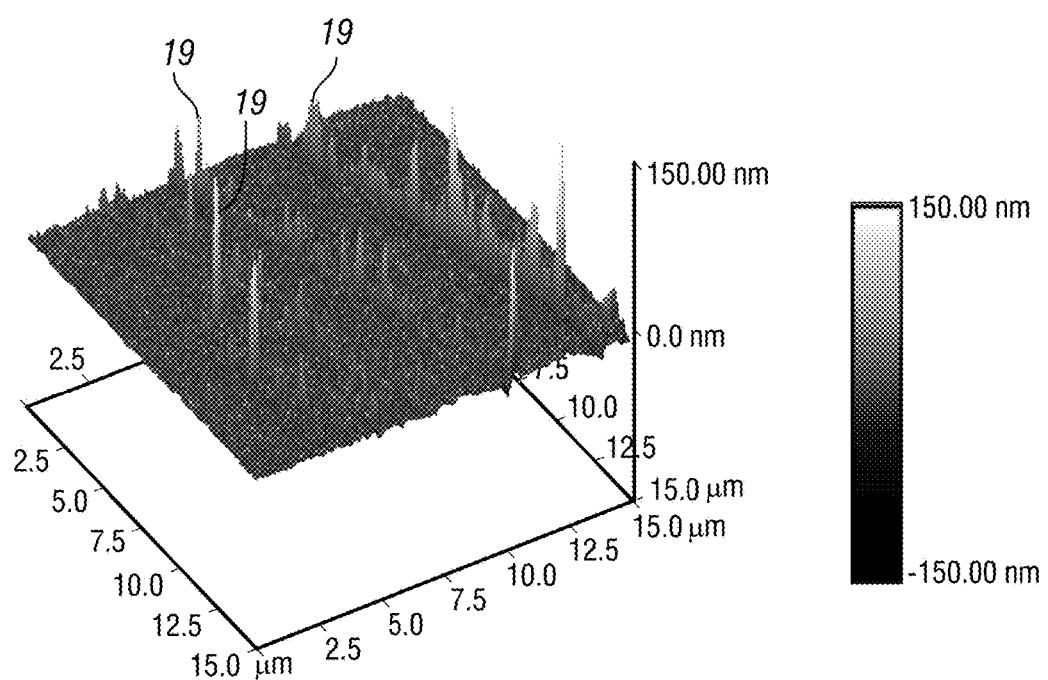
FIG. 3 is an atomic force microscopic (AFM) image of glass with surface flaws on the nanoscale.

Flaws in glass, ceramic and other materials can be a point defect, scratch or crack and cause a heterogeneous blemish as illustrated in FIG. 1, which provides a cross sectional view of a flaw. Such flaws are typically characterized by uneven depth 1, 2, 3 and varying, oftentimes sharp-edged radii (width) 4, 5. Such flaws can be the result of damage caused by external trauma or, as illustrated in FIGS. 2A and 2B, they can be an artifact of the manufacturing process. Flaws can be nano- to micro- and larger-scales. Many of the flaws appear as indents into the surface while some appear as bumps and ridges on the surfaces. The flaws in the glass surfaces depicted in the atomic force microscopic (AFM) images, for example, FIG. 2A and FIG. 2B, 10, are not visible to the unaided eye. FIG. 3 shows nanoscale flaws in glass using an atomic force microscope (AFM). Peaks on the graph in FIG. 3, 19, correspond to flaws in the glass with higher and more lightly colored peaks indicating flaws that have penetrated more deeply into the glass's surface than lower and darker colored peaks.

Figure 4:
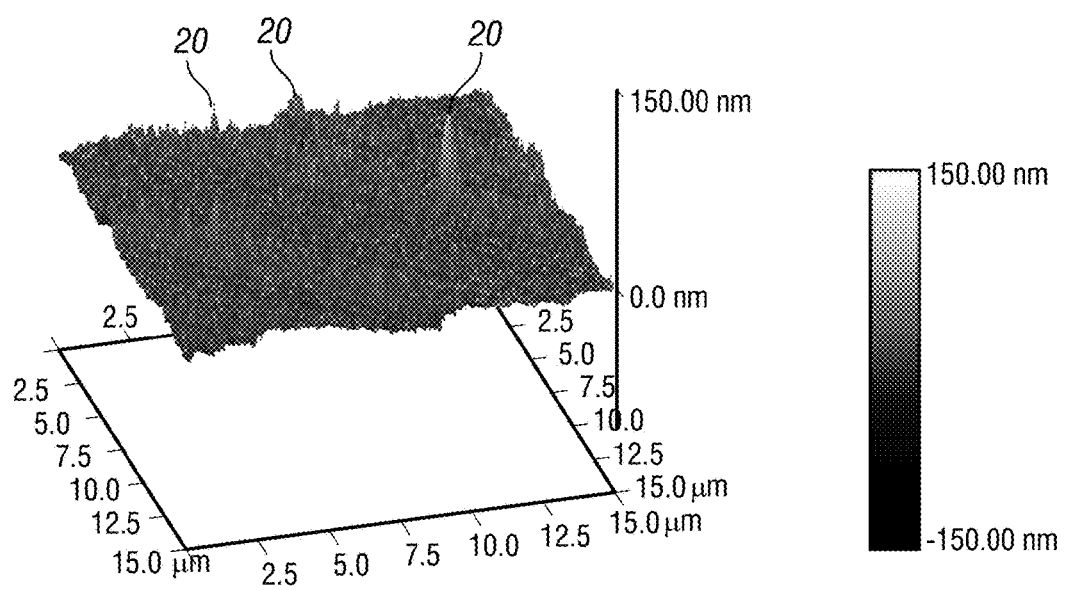
FIG. 4 is an atomic force microscopic (AFM) image of the same piece of glass as in FIG. 3 after application of at least one embodiment of the composition showing fewer and less prominent flaws.

The nanoparticles contained in embodiments of the invention repair such flaws, as illustrated in FIG. 1, by, for example, capping the defect 6, bridging the defect 7, layering along the walls of the defect 8, anchoring the bottom of the defect 9 and by otherwise self-assembling in the area of the defect. These flaws are altered in one or more ways including reinforced, reduced in size, strengthened in a region of heightened stress, or eliminated and thereby repaired. FIG. 4 is an AFM image of the same piece of glass as in FIG. 3 after application of at least one embodiment of the composition (Example 1) showing fewer and less prominent peaks 20. Other embodiments of the composition containing the other disclosed and claimed ingredients herein and/or prepared by the disclosed and claimed methods herein accomplish the same end.

Figure 5A:
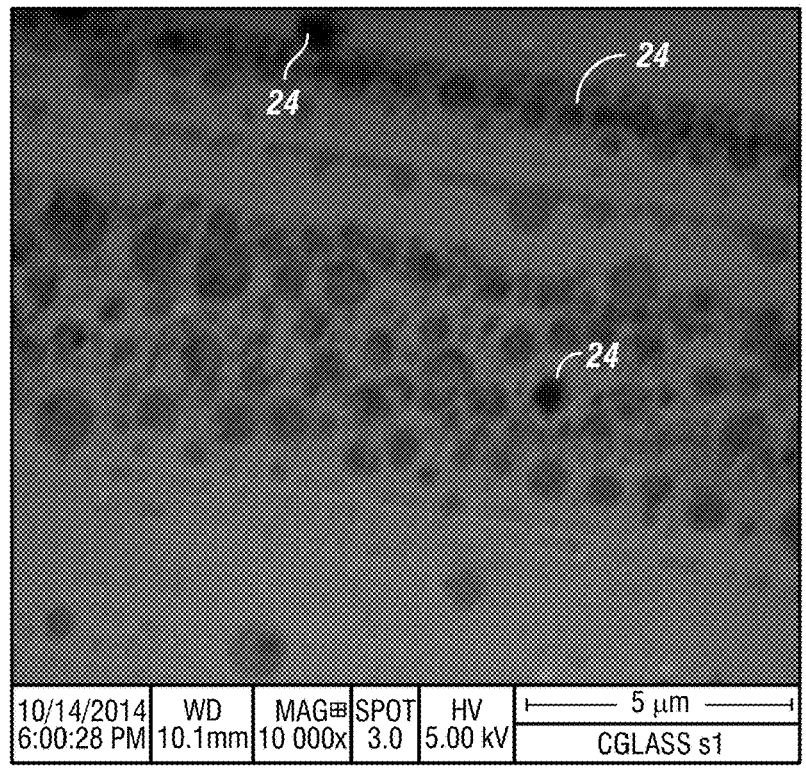
FIG. 5A shows a SEM image, taken at 10,000× magnification, of a glass surface where the active ingredients from embodiments of the composition have found flaws on the glass surface and have self-assembled to repair the flaws.
Figure 5B:
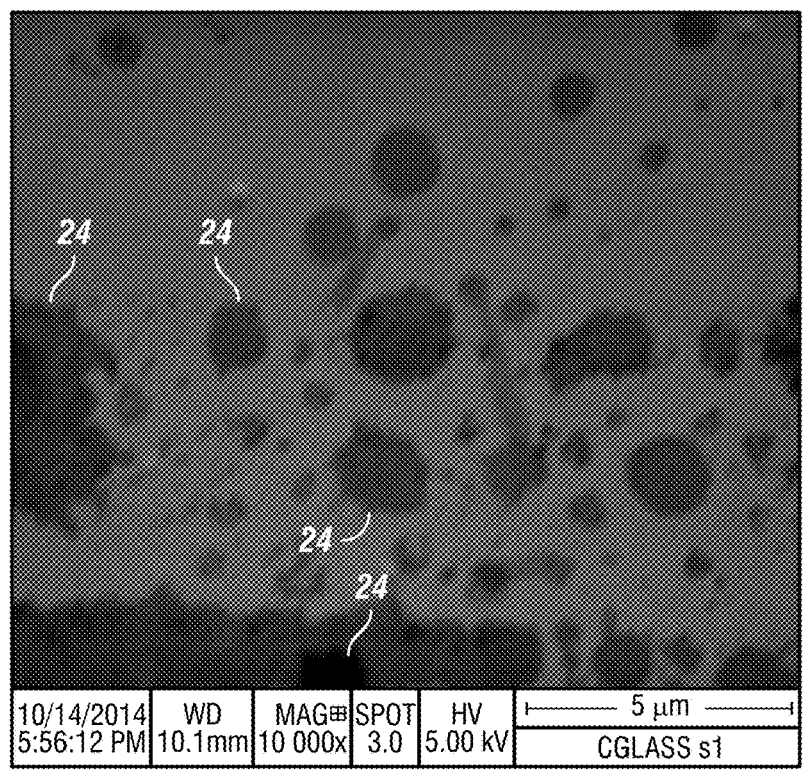
FIG. 5B shows a SEM image, taken at 10,000× magnification, of a glass surface where the active ingredients from embodiments of the composition have found flaws on the glass surface and have self-assembled to repair the flaws.
Figure 5C:
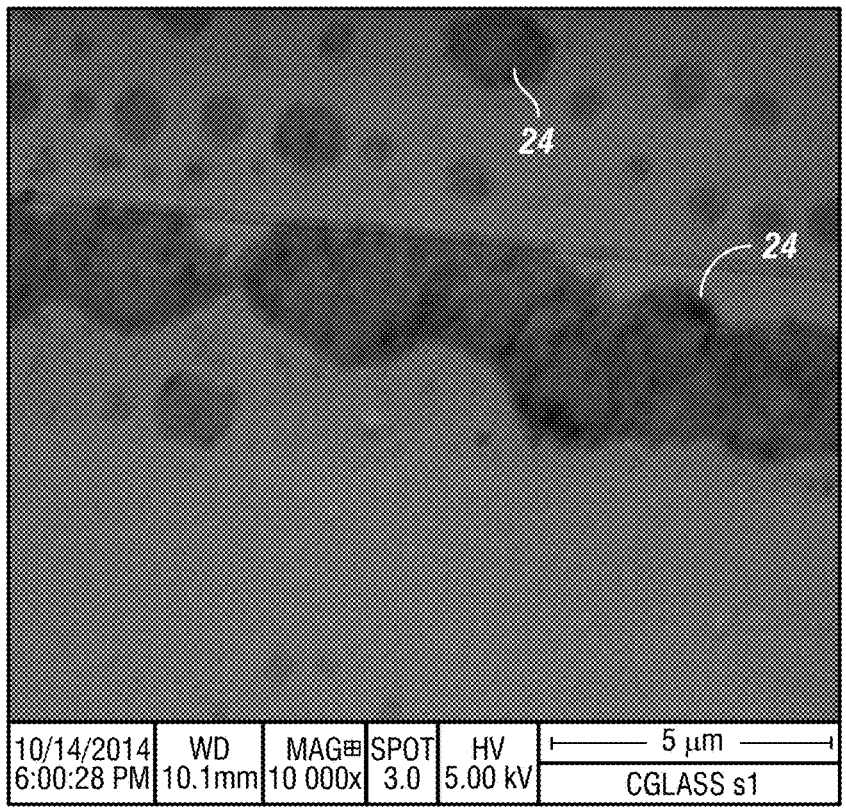
FIG. 5C shows a SEM image, taken at 10,000× magnification, of a glass surface where the active ingredients from embodiments of the composition have found flaws on the glass surface and have self-assembled to repair the flaws.
Figure 6A:
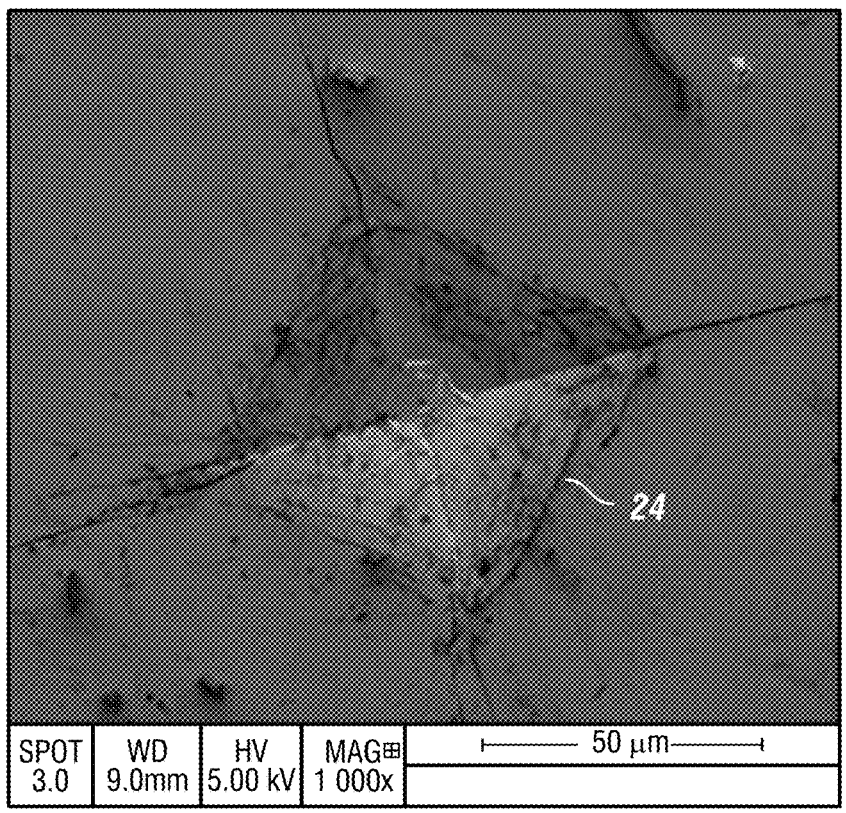
FIG. 6A shows a SEM image at 1000× magnification of damaged glass after embodiments of the composition have been applied.
Figure 6B:
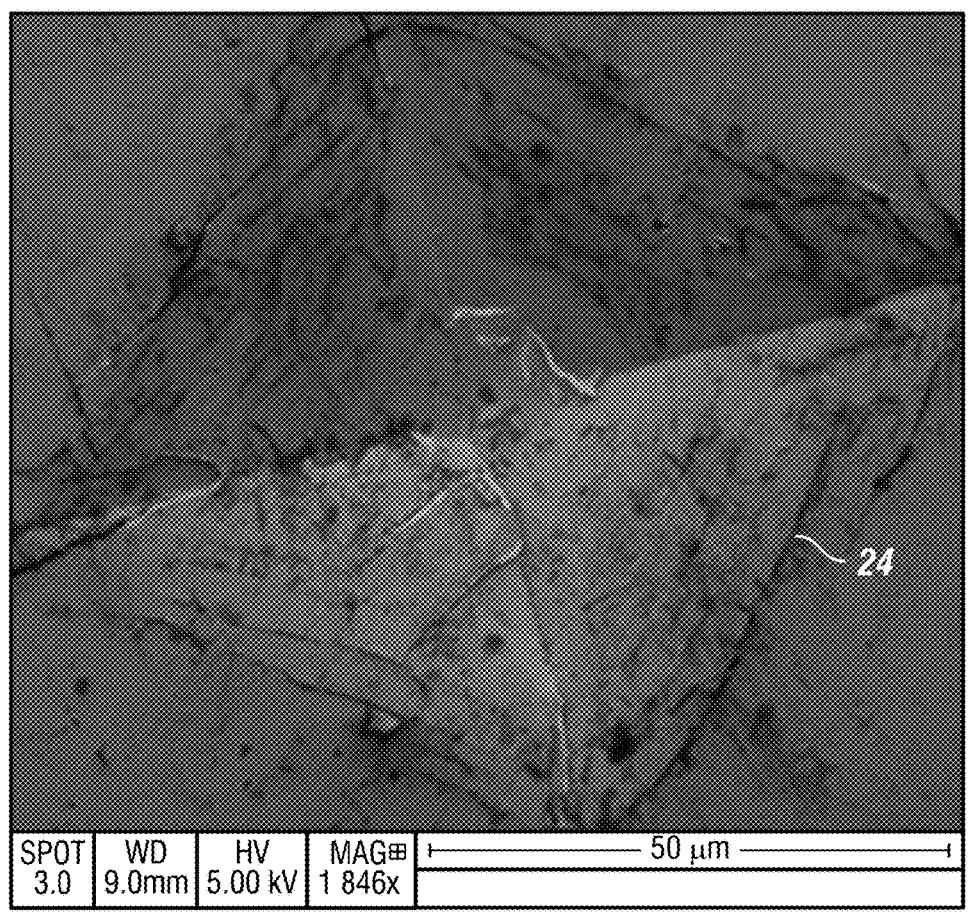
FIG. 6B shows a SEM image of damaged glass at 1864× magnification after embodiments of the composition have been applied.
Figure 6C:
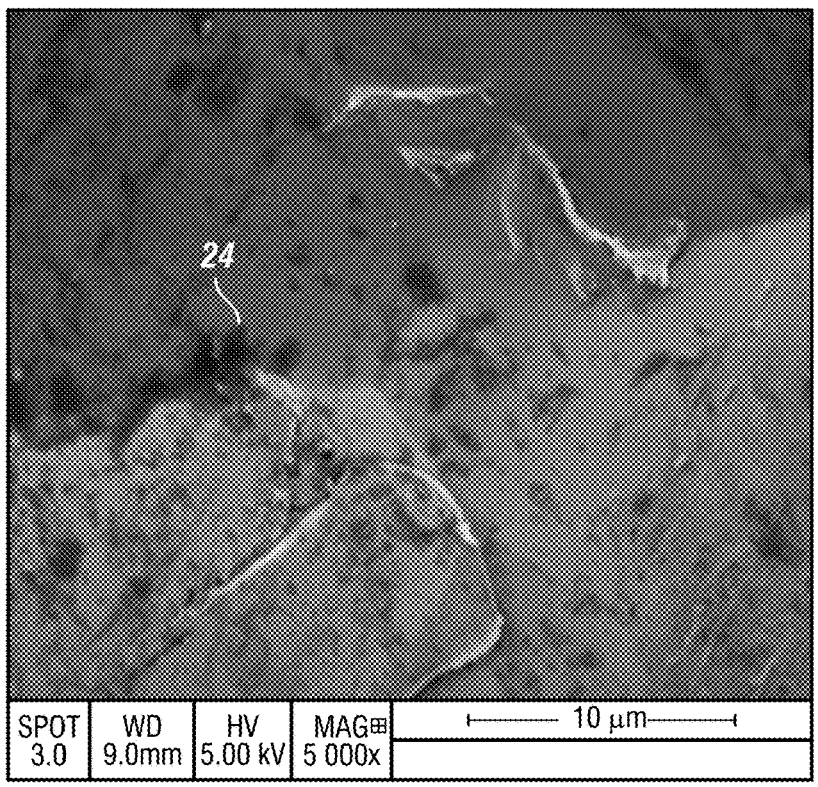
FIG. 6C shows a SEM image of damaged glass at 5000× magnification after embodiments of the composition have been applied.
Figure 6D:
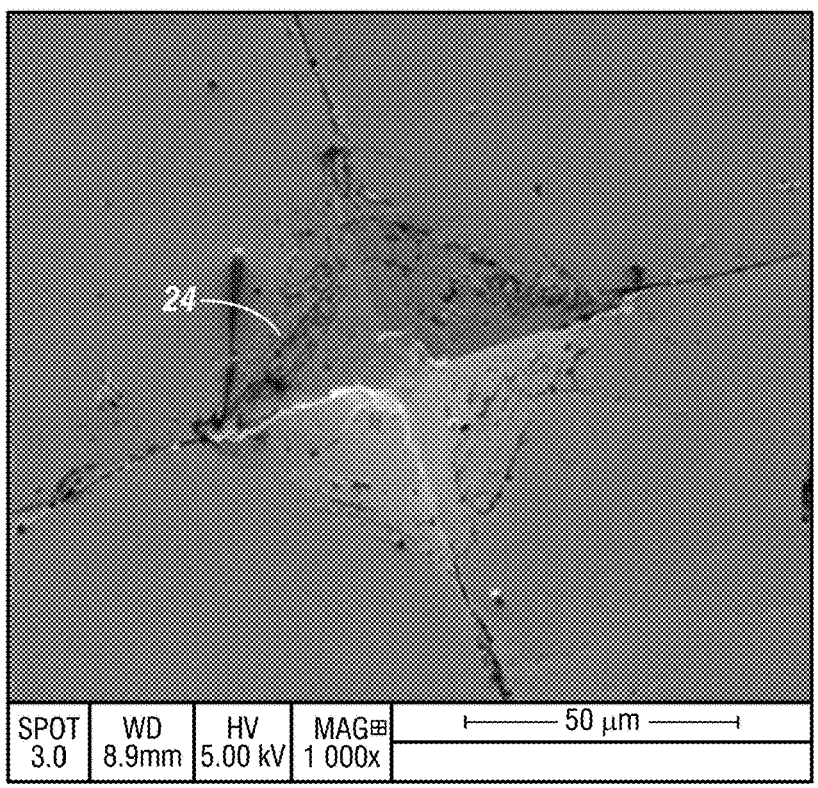
FIG. 6D shows a SEM image of damaged glass at 1000× magnification after embodiments of the composition have been applied.
Figure 6E:
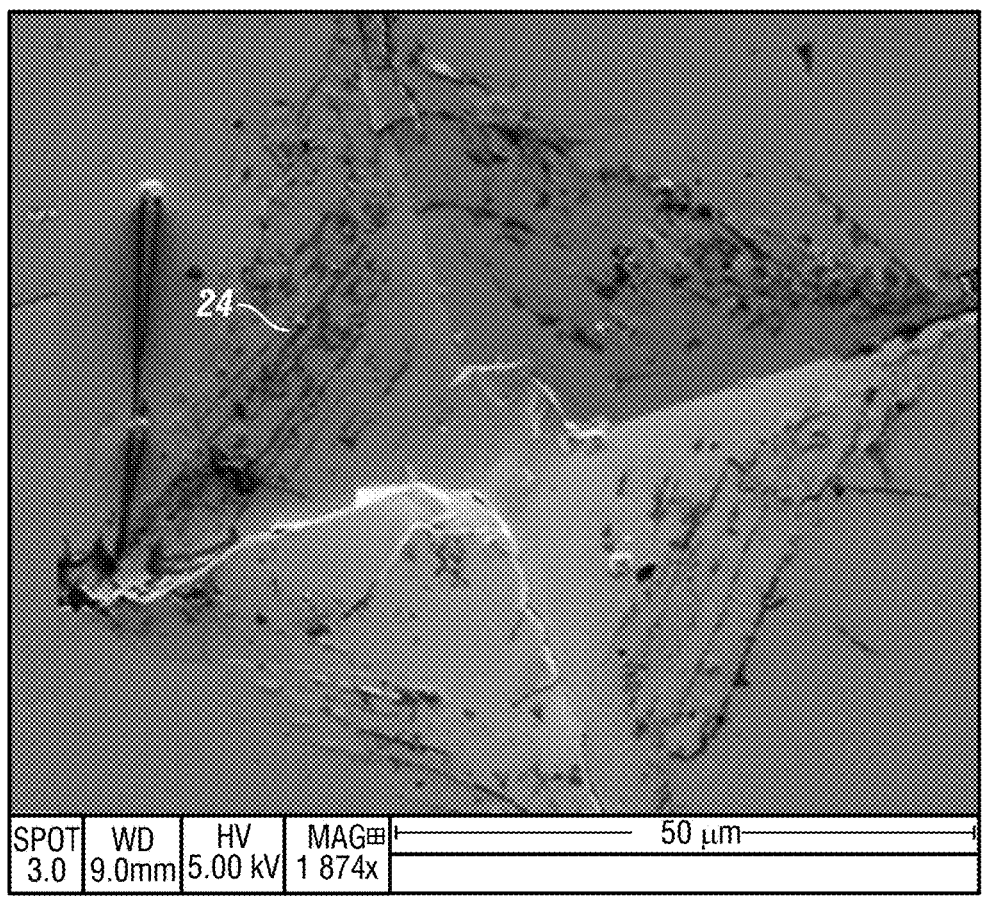
FIG. 6E shows a SEM image of damaged glass at 1874× magnification after embodiments of the composition have been applied.
Figure 6F:
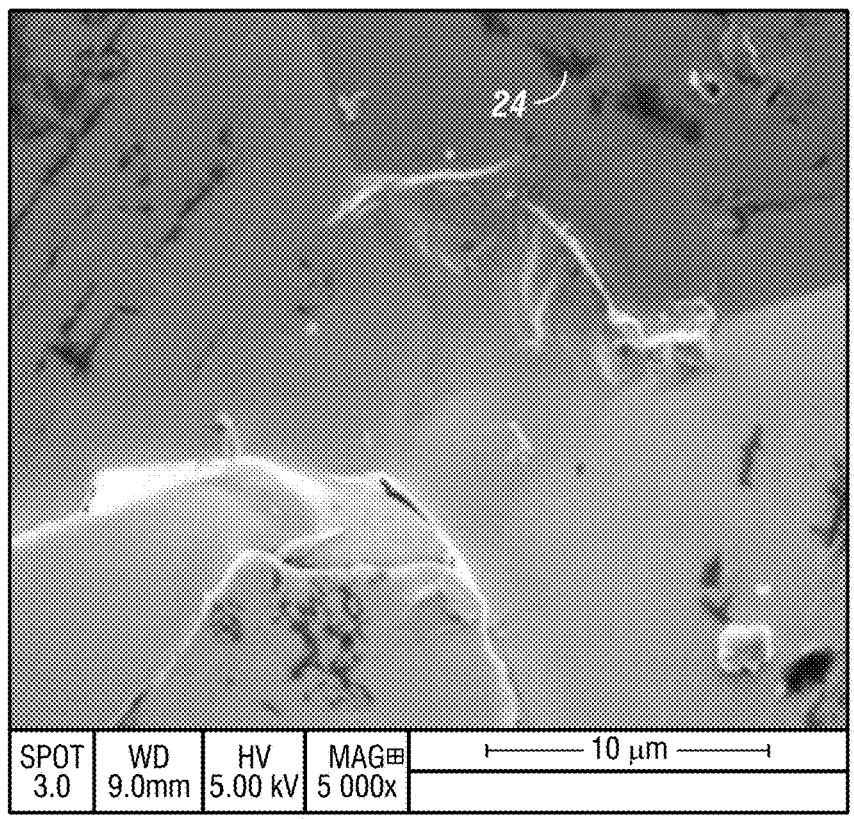
FIG. 6F shows a SEM image of damaged glass at 5000× magnification after embodiments of the composition have been applied.
Figure 6G:
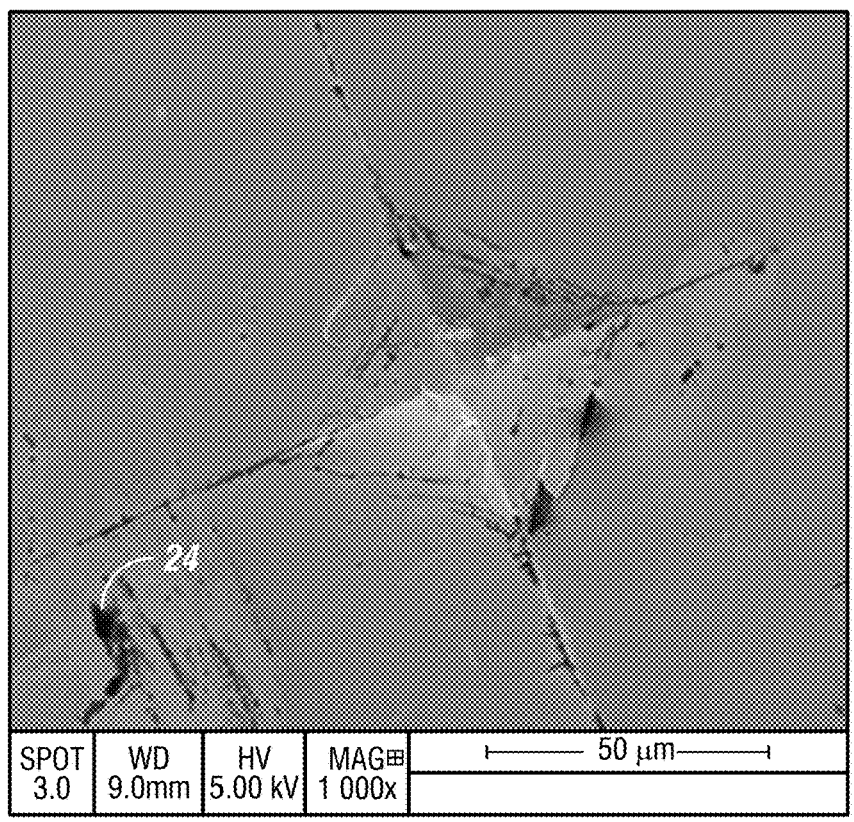
FIG. 6G shows a SEM image of damaged glass at 1000× magnification after embodiments of the composition have been applied.
Figure 6H:
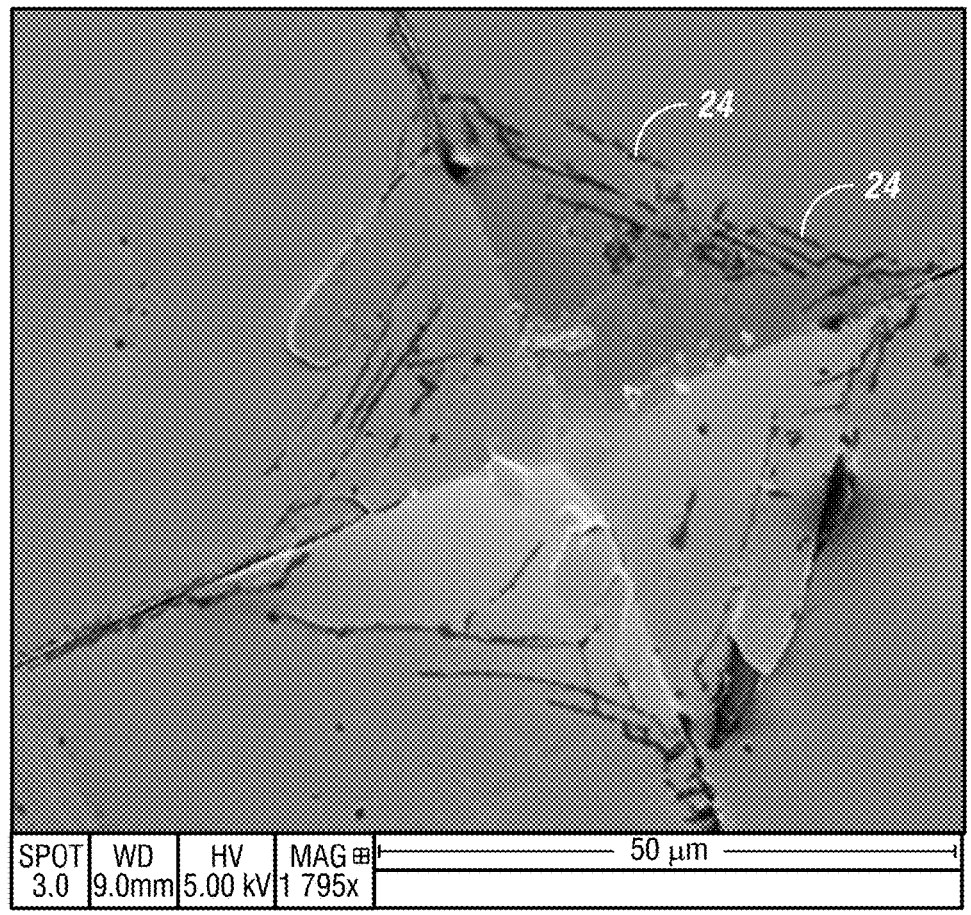
FIG. 6H shows a SEM image of damaged glass at 1795× magnification after embodiments of the composition have been applied.
Figure 6I:
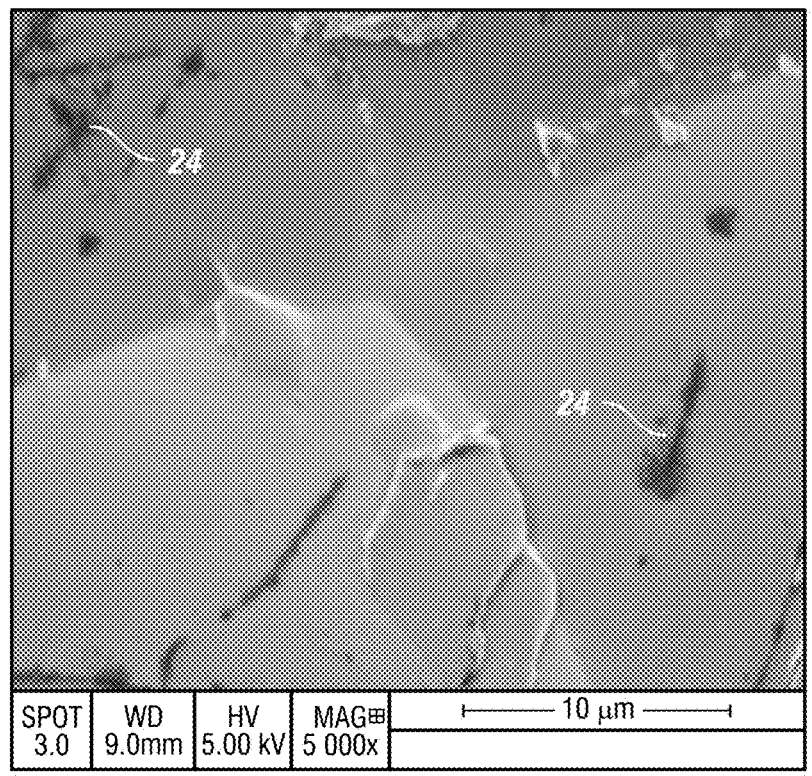
FIG. 6I shows a SEM image of damaged glass at 5000× magnification after embodiments of the composition have been applied.
Figure 7A:
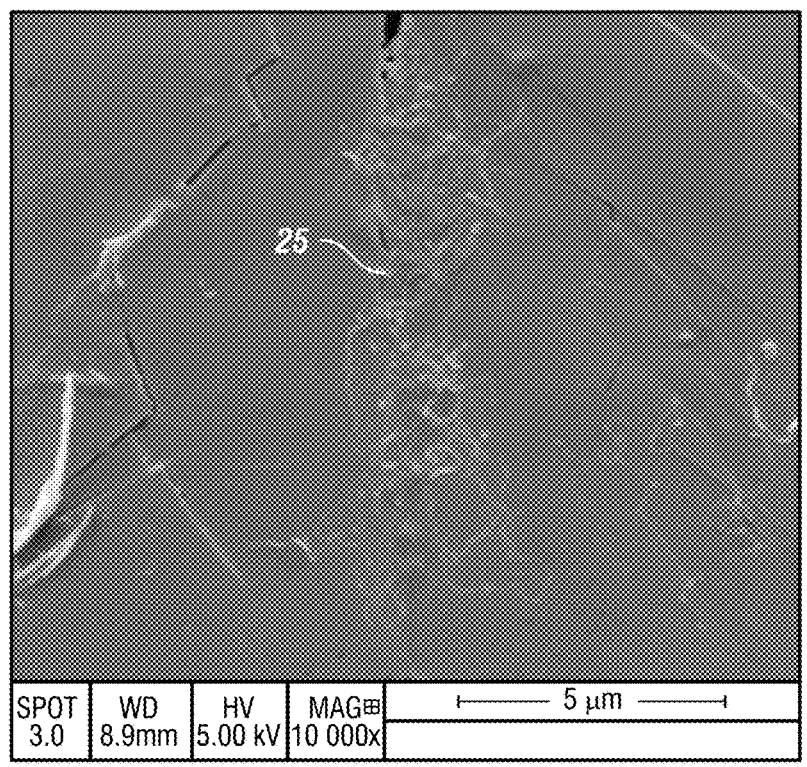
FIG. 7A shows a SEM image of damaged glass at 10,000× magnification after embodiments of the composition have been applied.
Figure 7B:
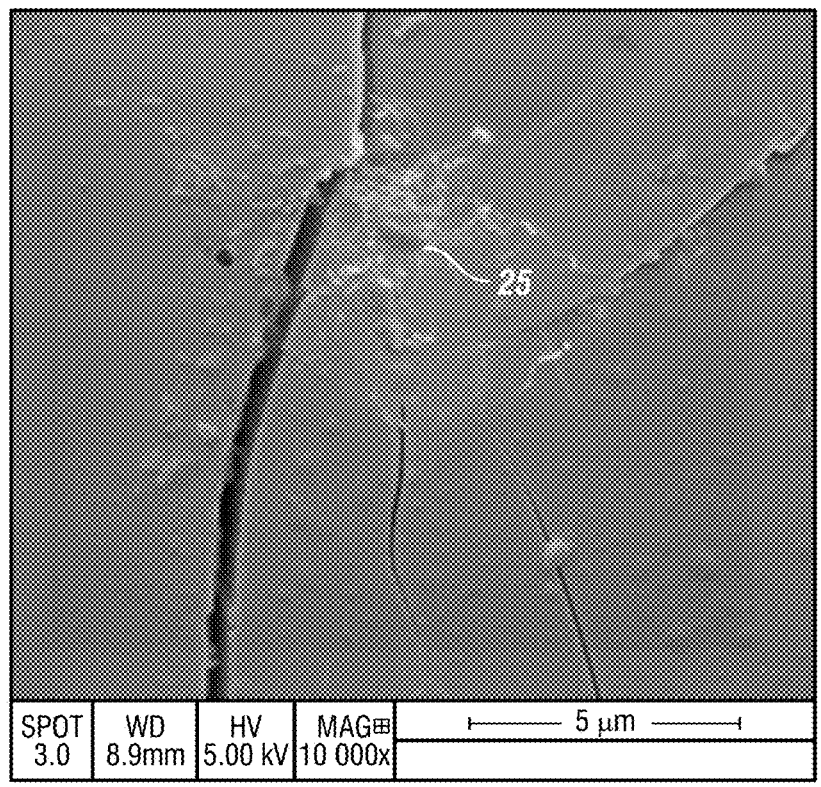
FIG. 7B shows a SEM image of damaged glass at 10,000× magnification after embodiments of the composition have been applied.
Figure 7C:
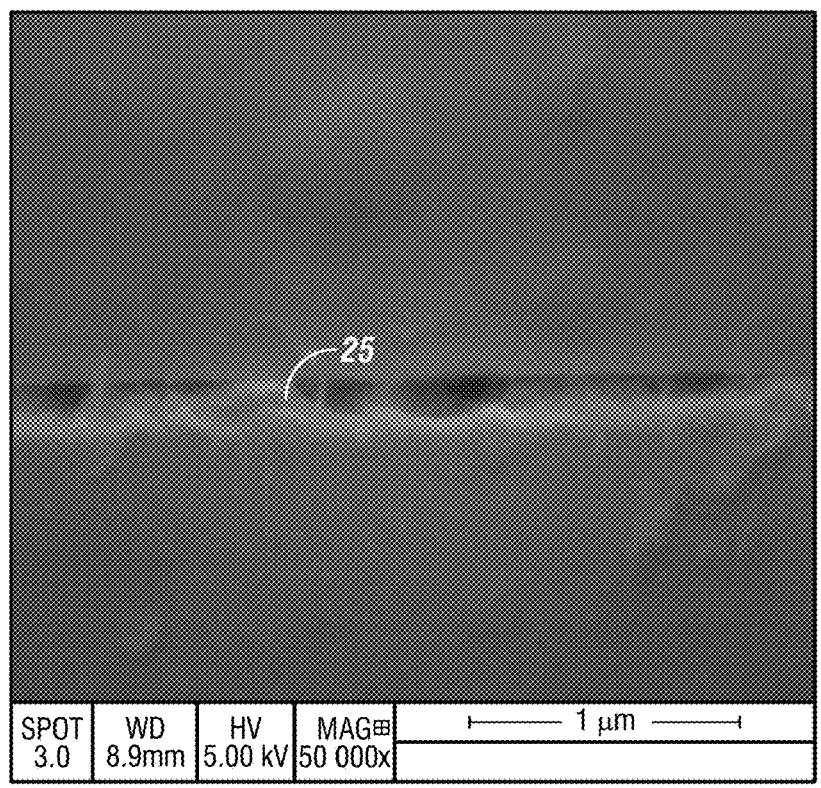
FIG. 7C shows a SEM image of damaged glass at 50,000× magnification after embodiments of the composition have been applied.
Figure 7D:
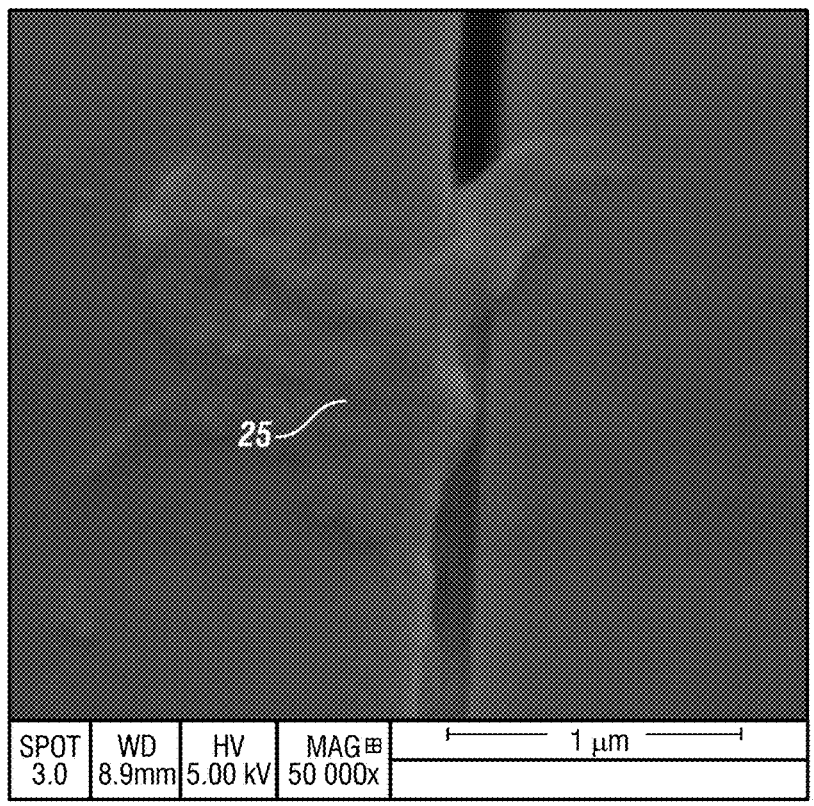
FIG. 7D shows a SEM image of damaged glass at 50,000× magnification after embodiments of the composition have been applied.
Figure 7E:
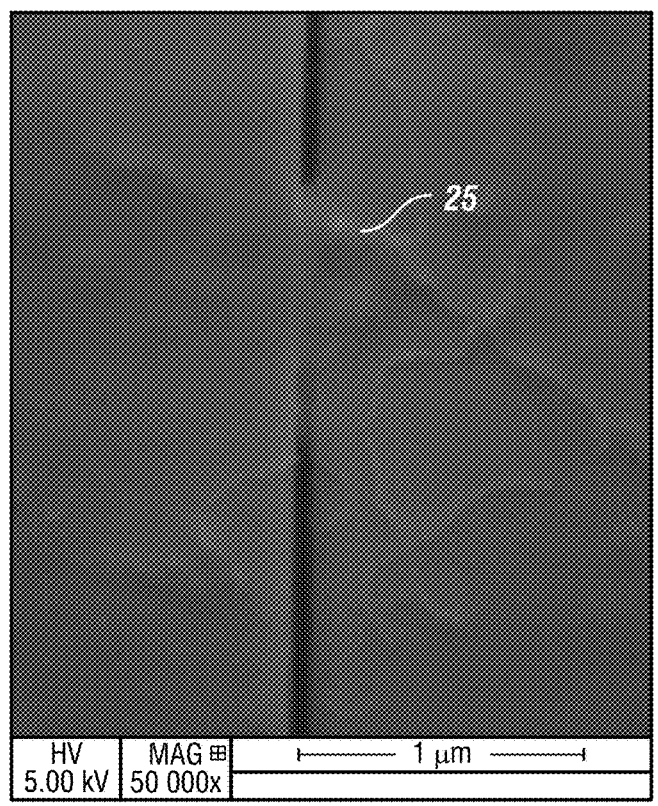
FIG. 7E shows a SEM image of damaged glass at 50,000× magnification after embodiments of the composition have been applied.
Figure 7F:
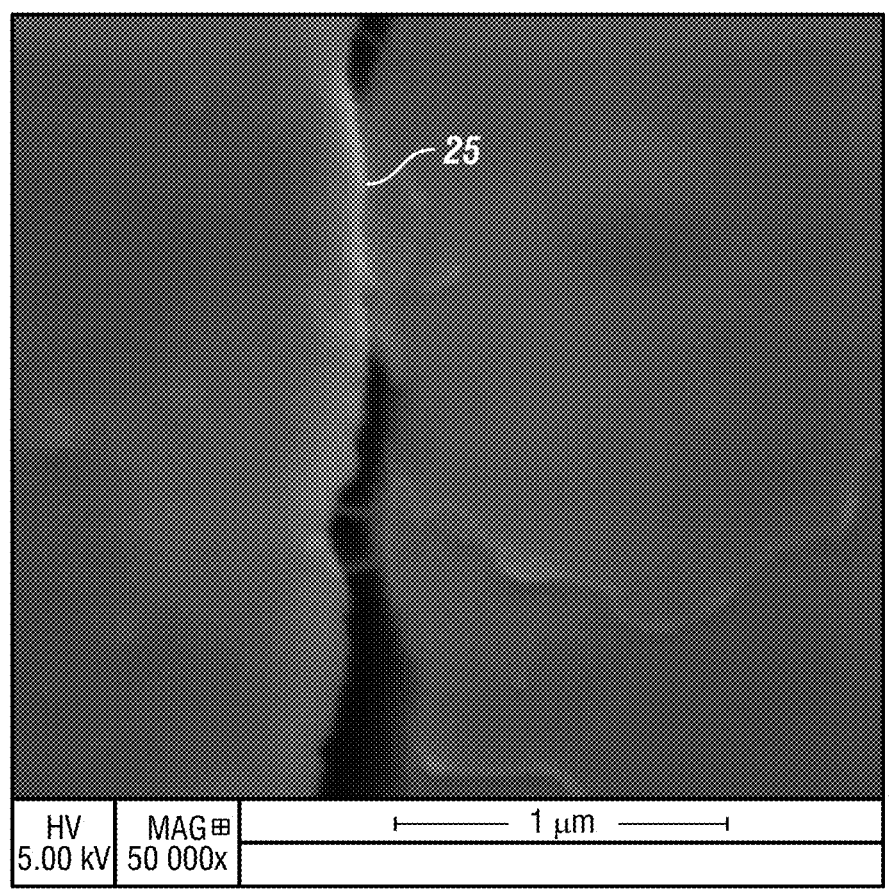
FIG. 7F shows a SEM image of damaged glass at 50,000× magnification after embodiments of the composition have been applied.
Figure 8:
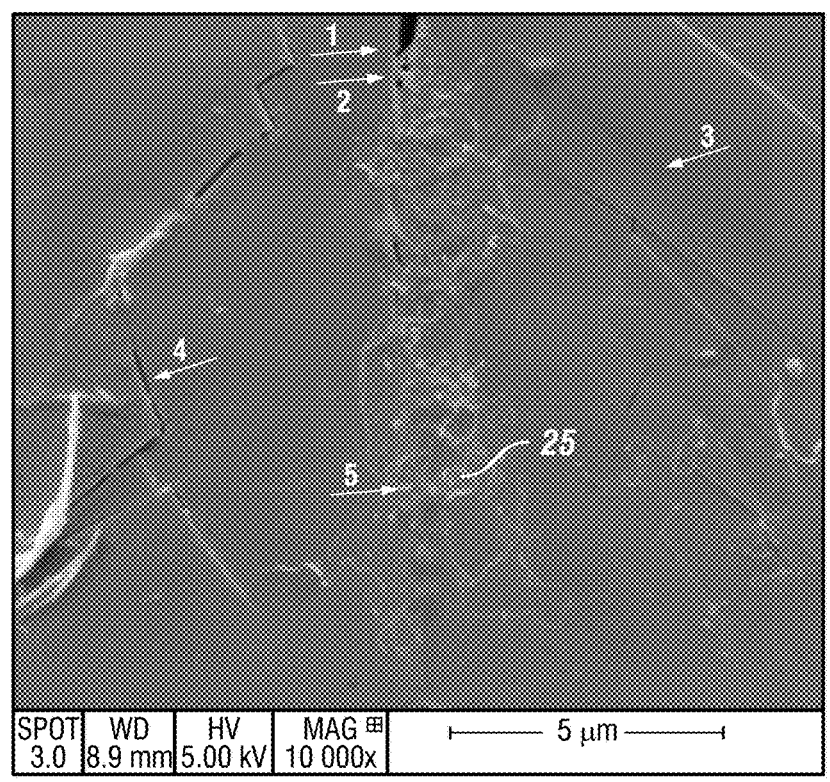
FIG. 8 is a SEM image, taken at 10,000× magnification, of flawed glass after embodiments of the composition have been applied.
Figure 9:
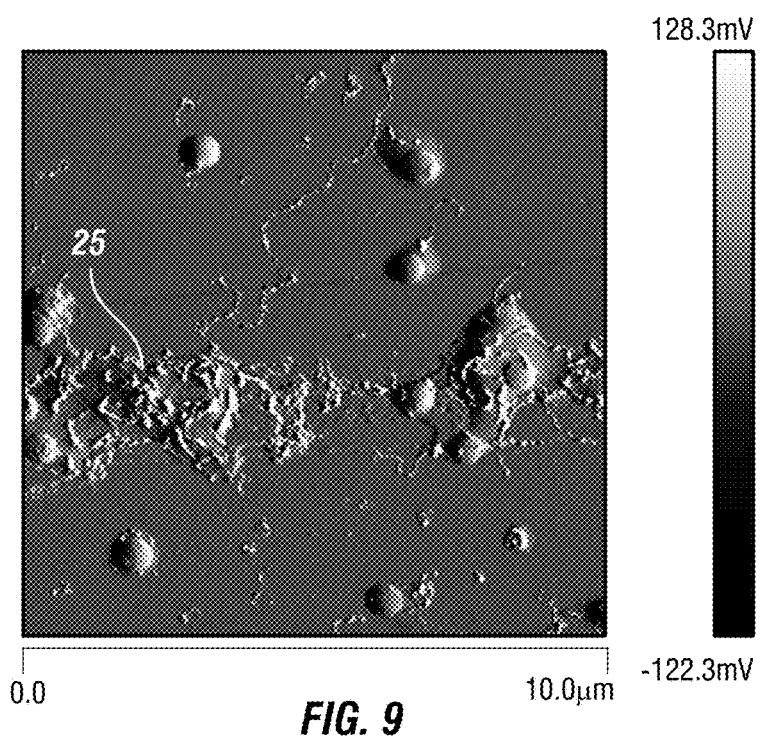
FIG. 9 is an AFM image of flawed glass showing areas where flaws are being healed by embodiments of the composition.

Embodiments of the composition move active ingredients to the glass, ceramic, PSA on film and other material, not as a continuous coating, but as heterogeneous nano-self-assemblies on the surfaces where they are applied. FIGS. 5A, 5B and 5C show SEM images, taken at 10,000× magnification, of a glass surface where the active ingredients from embodiments of the composition have found flaws on the glass surface and have self-assembled to repair the flaws. The darker regions in FIGS. 5A, 5B and 5C, 24, to highlight a few examples, are where the active ingredients have self-assembled, clustered around the flaws and repaired them. FIG. 6A-FIG. 6I show several SEM images, at various magnifications, of damaged glass. The dark regions, for example 24, are where the active ingredients of embodiments of the composition have found damaged areas and self-assembled themselves to repair the damage. FIG. 7A-FIG. 7F show SEM images, at various magnifications, of flawed glass in which the active ingredients of embodiments of the composition have filled in the flaws, for example 25. Once applied, the composition repairs the defects locally by filling in, covering, bridging, and altering the depth of flaws in the glass. FIG. 8 is a SEM image of flawed glass, after embodiments of the composition have been applied, showing regions, for example 25, where active ingredients have filled in and healed flaws. FIG. 9 is an atomic force microscopic image of glass, after embodiments of the composition have been applied, showing active ingredients filling in areas with flaws 25.

Figure 10A:
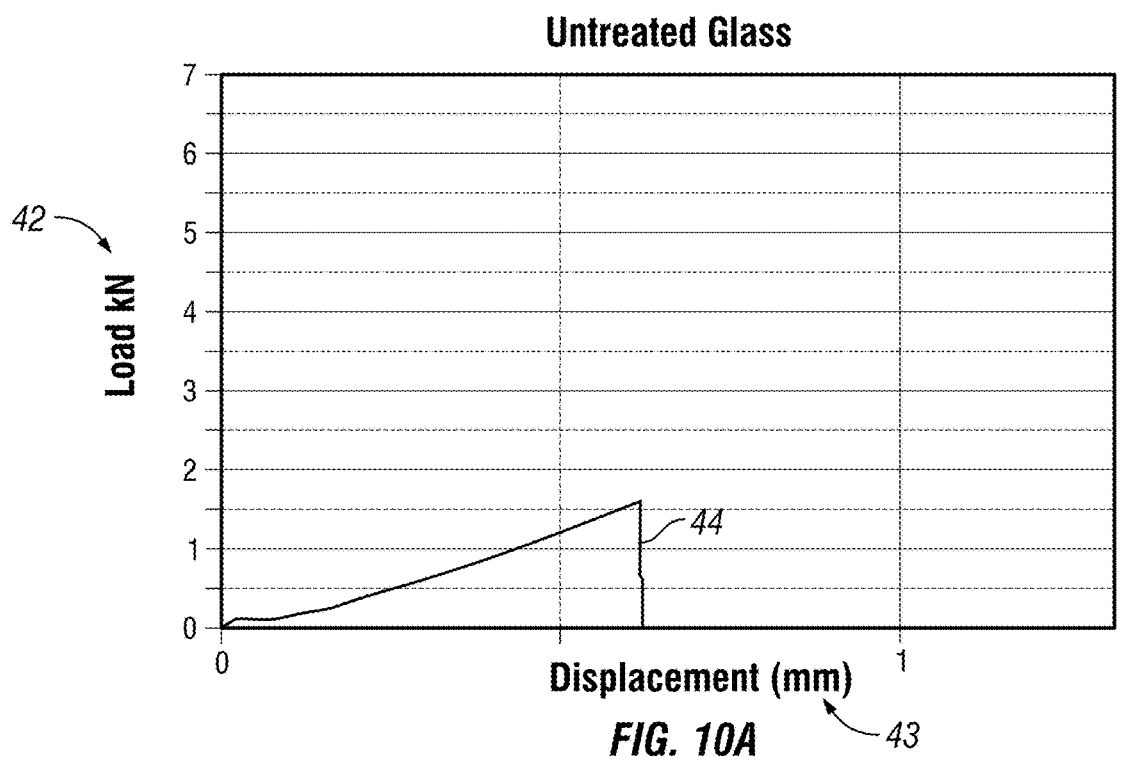
FIG. 10A is a graph of the results of untreated glass tested with the ASTM C1499.
Figure 10B:
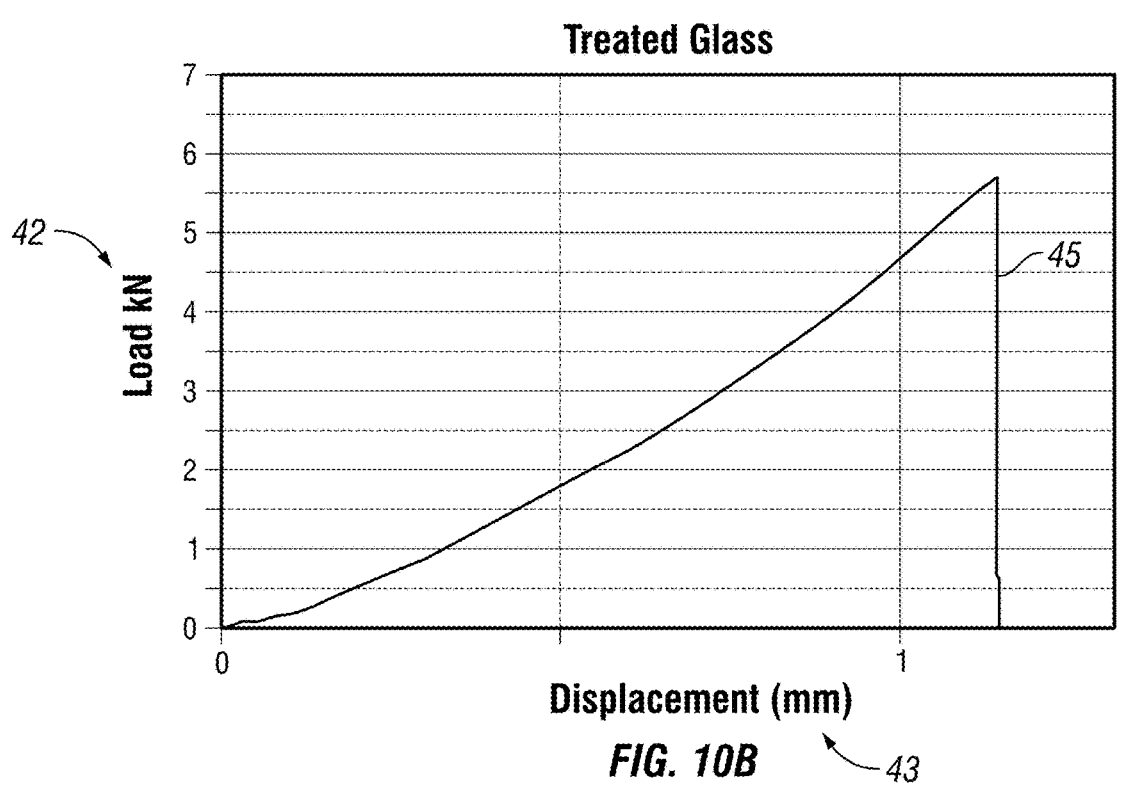
FIG. 10B is a graph of the results of glass treated with at least one embodiment of the composition and then tested with the ASTM C1499.

The composition in Example 1, when applied to glass and tested using the ASTM C1499, yields an increase in strength as measured by equibiaxial strength of greater than 250%. FIG. 10A graphs the results of an ASTM C1499 test on untreated glass with the amount of force applied (load) measured in kilonewtons (kN) on the vertical axis 42 and the corresponding displacement in the glass measured in nanometers (nm) 43. The vertical line 44 on the graph in FIG. 10A shows the point at which the untreated glass breaks. Approximately 1.5 kN of force is required. FIG. 10B graphs the results of an ASTM C1499 test on glass treated with the composition in Example 1 again plotting force 42 applied against displacement 43. The vertical line 45 in FIG. 10B shows that it takes a much greater force to break the treated glass (approximately 5.5 kN). This represents an improvement of 266% for the treated vs. the untreated glass. Other embodiments of the composition containing the other disclosed and claimed ingredients herein and/or prepared using the disclosed and claimed methods herein achieve similar results.

Figure 11:
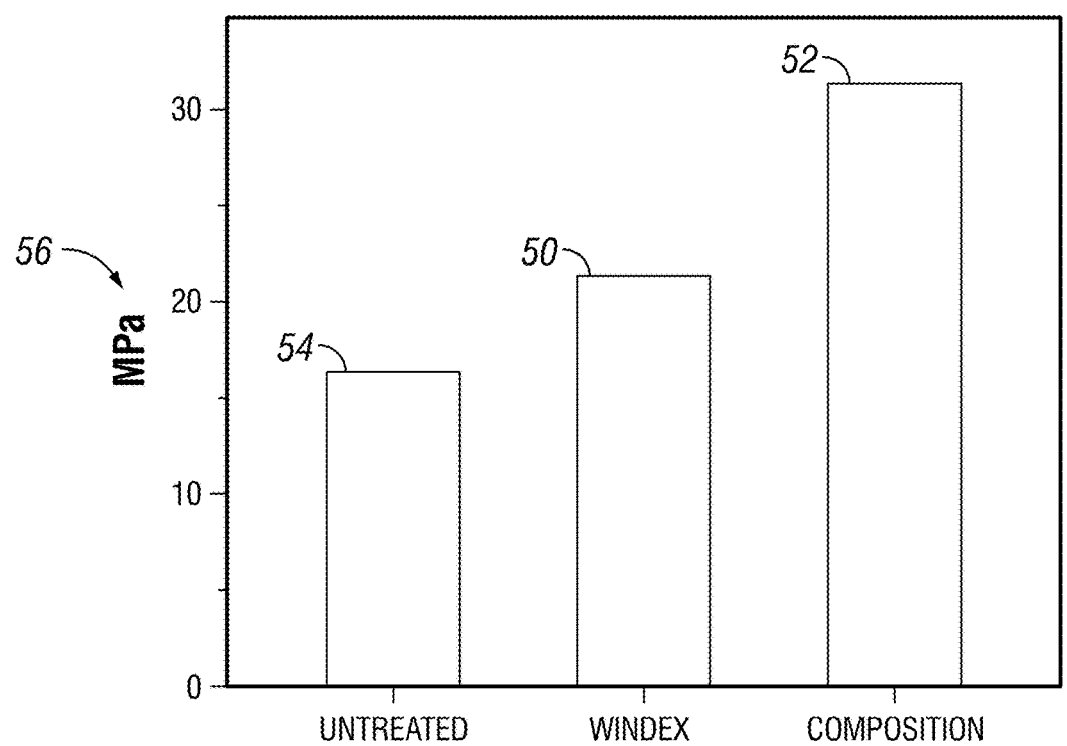
FIG. 11 charts ASTM C1499 test data for glass treated with two different embodiments of the composition as compared to untreated (plain) glass. In this data, glass treated with embodiments of the composition with and without glass cleaning product (Windex) are compared to untreated glass to illustrate that embodiments of the composition can also serve as a glass cleaning solution with the added benefit of strengthening.

FIG. 11 charts ASTM C1499 test data for glass treated with two different embodiments of the solution as compared to untreated (plain) glass. In this data, glass treated with embodiments of the composition with 50 and without 52 glass cleaning product (Windex) exhibit greater strength than untreated glass 54. The force applied to each piece of glass is measured on the vertical axis 56 in megapascals (MPa). The results show that embodiments of the composition with glass cleaner can serve as a glass cleaning solution with the added benefit of strengthening.

Figure 12C:
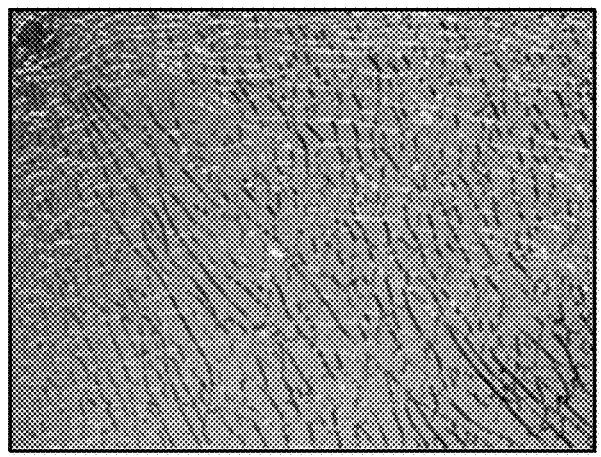
FIG. 12C shows the results of damage to tempered safety glass.
Figure 12B:
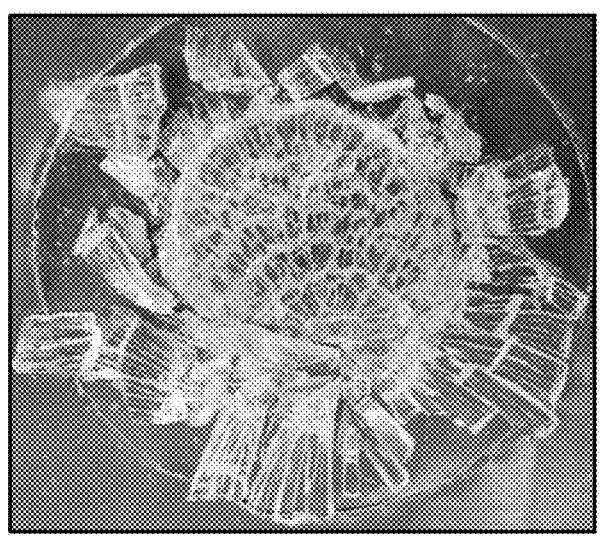
FIG. 12B shows the results of damage to glass treated with at least one embodiment of the composition.
Figure 12A:
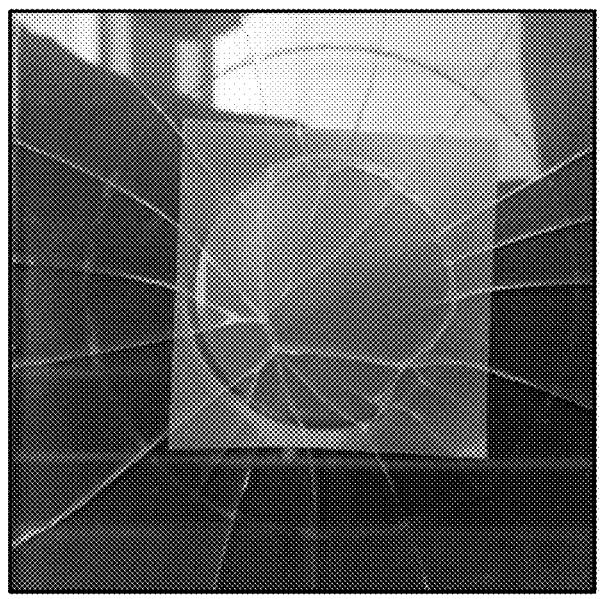
FIG. 12A shows the results of damage to untreated glass.

Treated glass, when it does break under duress, fragments in a less dangerous pattern of shards than untreated glass. FIG. 12A shows how untreated glass breaks into large shards with sharp, pointed edges when subjected to external force. As shown in FIG. 12B, glass treated with Example 1 breaks in smaller pieces that lacks such pointed edges when subjected to external forces sufficient to cause breakage, which is similar to what happens to tempered glass, as illustrated in FIG. 12C. Other embodiments of the composition containing the other disclosed and claimed ingredients herein and/or prepared using the disclosed and claimed methods herein achieve similar results.

Figure 13:
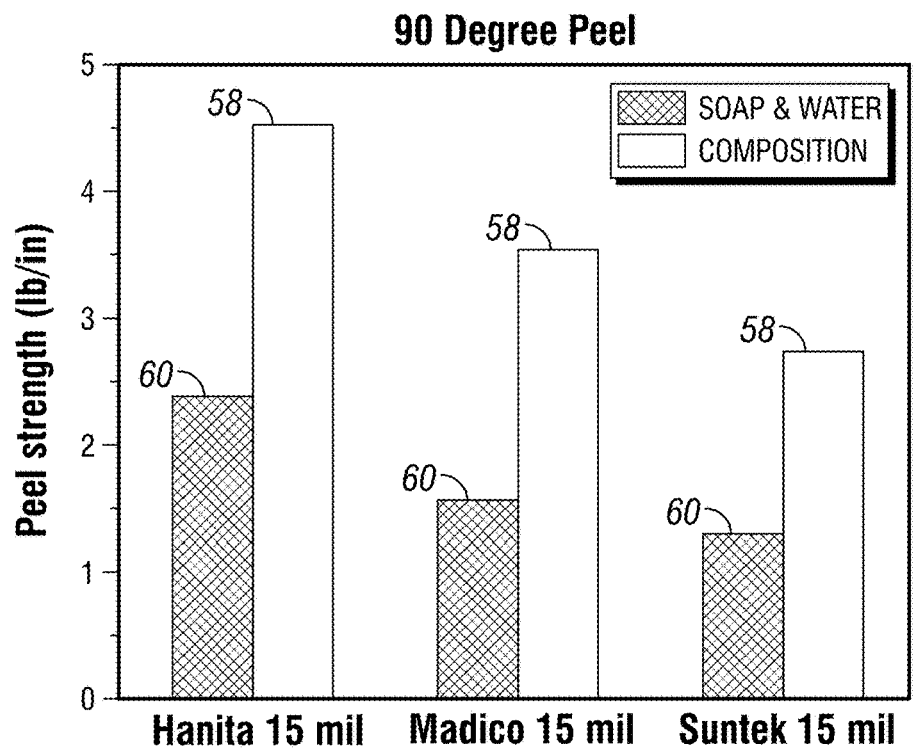
FIG. 13 depicts the 90 degree peel strength of three different brands of film (Hanita, Madico, SunTek) on glass treated with the composition of Example 1 compared to samples prepared with soap and water.
Figure 14:
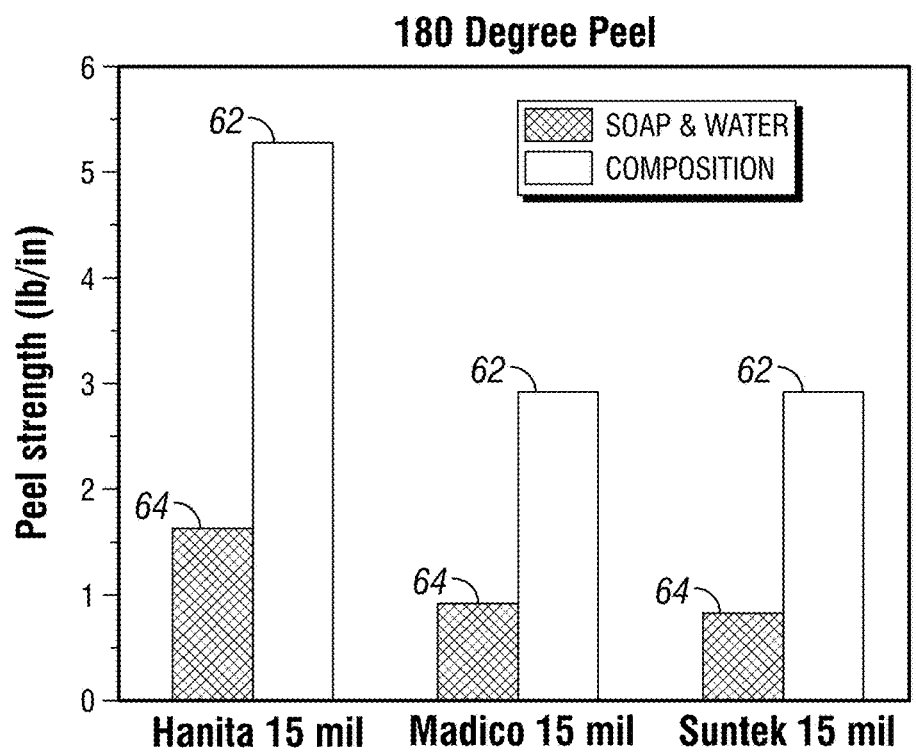
FIG. 14 depicts 180 degree peel strength of three different brands of film (Hanita, Madico, SunTek) on glass treated with the composition of Example 1 compared to samples prepared using soap and water.

Embodiments of this composition promote the adhesion of one or a plurality of layers of material thereby allowing the creation of strengthened laminates including, in some embodiments, a plurality of layers of material substrate that have been treated with embodiments of the composition to create a laminate. FIG. 13 depicts the 90 degree peel strength, measured in pounds per inch, of three different brands of film (Hanita 15 mil, Madico 15 mil, SunTek 15 mil) on glass treated 58 with Example 1 compared to samples prepared with soap and water 60. 90 degree peel strength involves the application of force at a 90 degree angle to the surface of the film. FIG. 14 depicts the 180 degree peel strength of three different brands of film (Hanita 15 mil, Madico 15 mil, SunTek mil) on glass treated 62 with Example 1 compared to samples prepared using soap and water 64. 180 degree peel strength involves the application of force at a 180 degree angle to the surface of the film. For both types of test and across all three brands, treated film displayed enhanced adhesion to glass as compared to untreated film. Other embodiments containing the other disclosed and claimed ingredients herein and/or prepared using the disclosed and claimed methods herein yield similar results.

Figure 15:
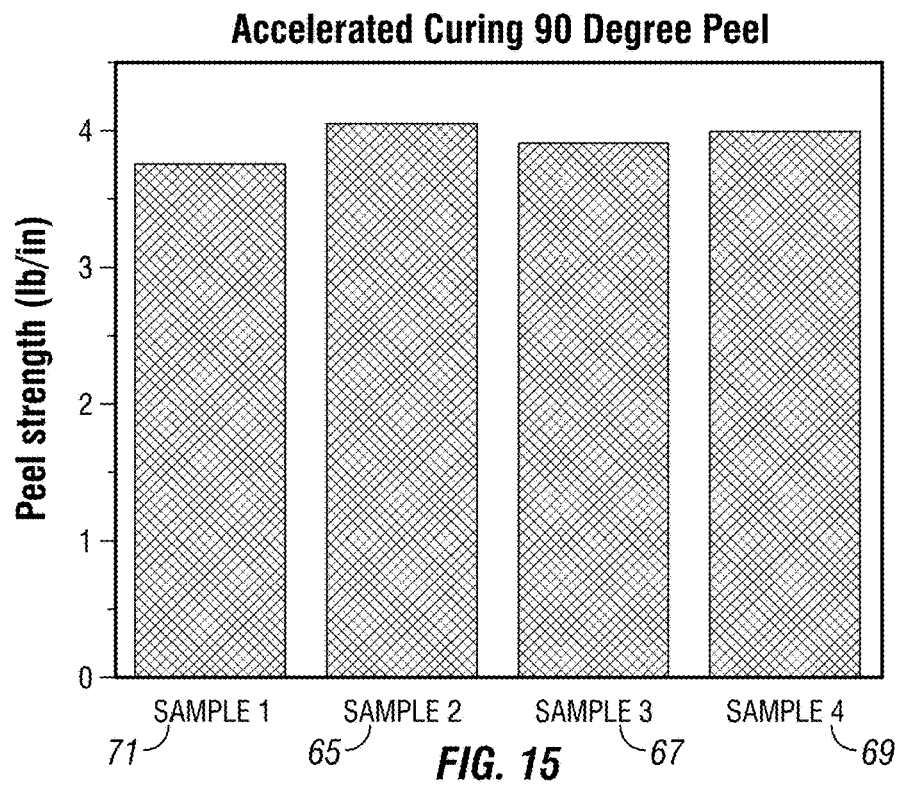
FIG. 15 depicts the 90 degree peel strength of film on glass treated with embodiments of the composition under conditions of accelerated curing.
Figure 16:
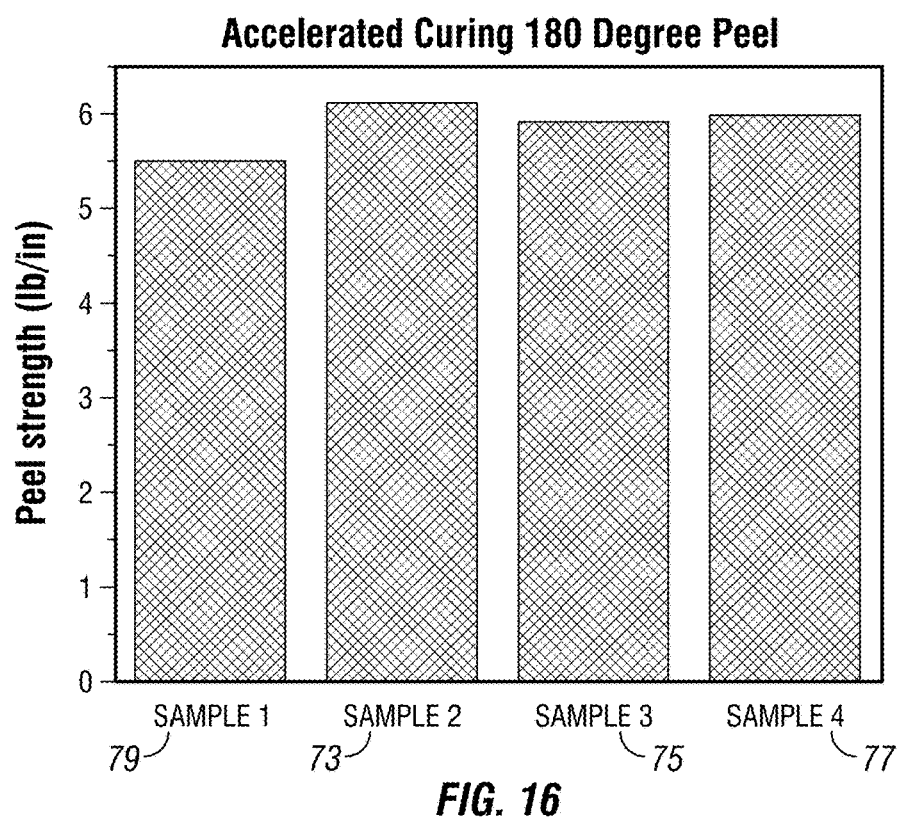
FIG. 16 depicts the 180 degree peel strength of film on glass treated with embodiments of the composition under conditions of accelerated curing.

FIG. 15 depicts the 90 degree peel strength of Madico 15 mil film in four different tests on glass treated with the composition (as formulated in Example 1) 65, 67, 69, 71 under conditions of accelerated curing. FIG. 16 depicts the 180 degree peel strength of film in four different tests on glass treated with embodiments of the composition (as formulated in Example 1) 73, 75, 77, 79 under conditions of accelerated curing. The samples of treated glass and film demonstrated greater adhesive strength than untreated film and glass, FIG. 13, 60 and FIG. 14, 64. Other embodiments containing the other disclosed and claimed ingredients herein and/or prepared using the disclosed and claimed methods herein yield similar results.

Figure 17:
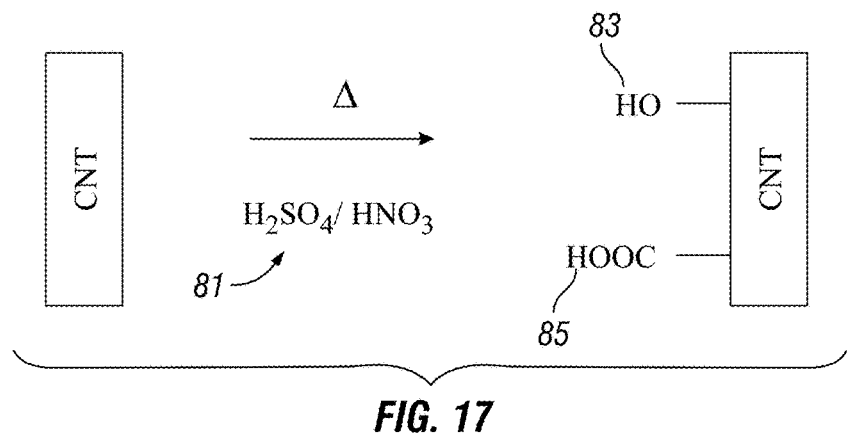
FIG. 17 shows surface modification of carbon nanotubes (CNTs).
Figure 18:
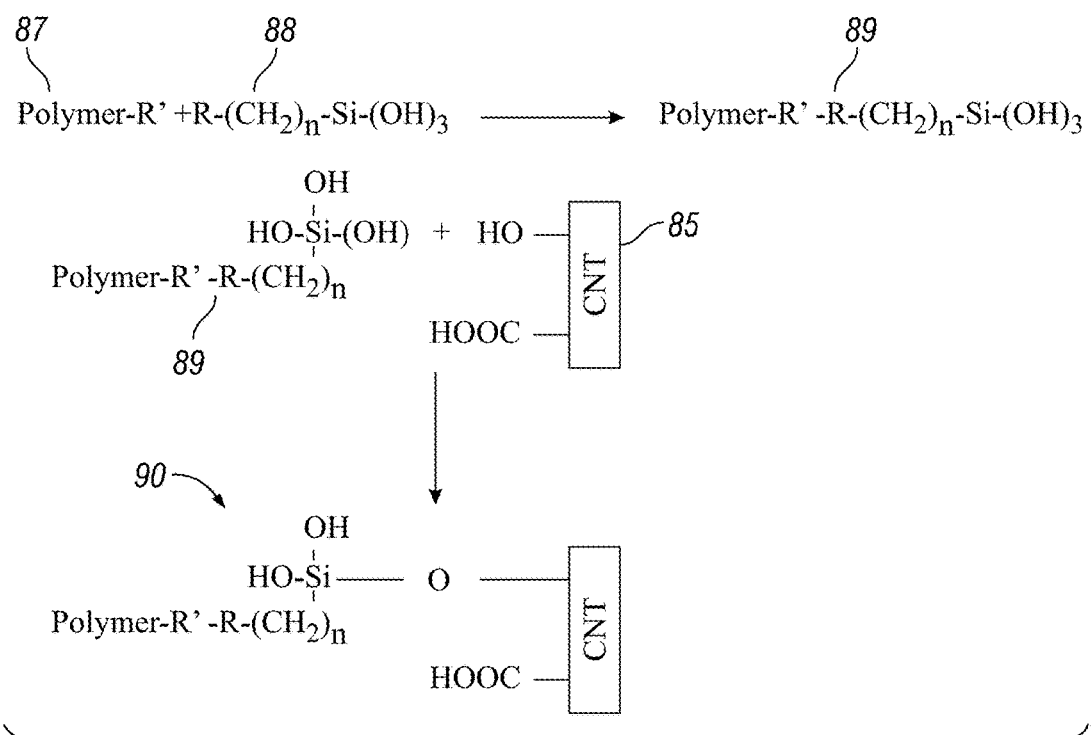
FIG. 18 illustrates a chemical reaction used to bind a silane compound, polymer and surface modified carbon nanotube to generate a functionalized carbon nanotube.
Figure 19:
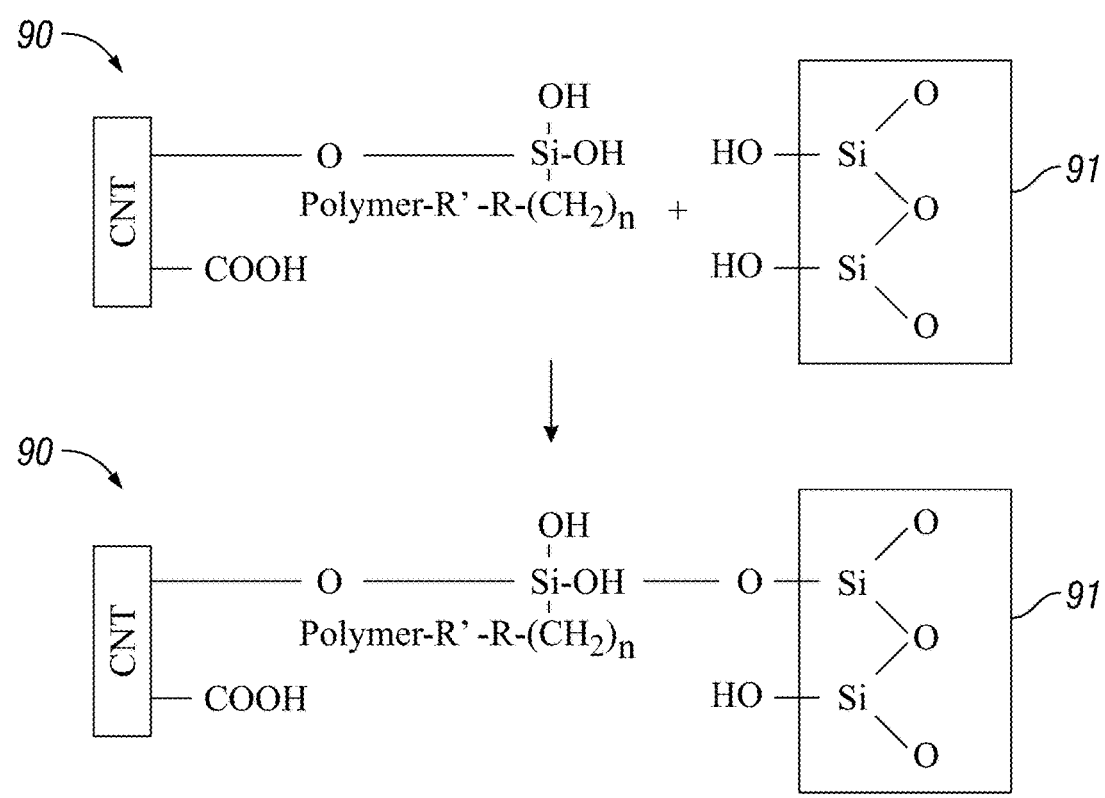
FIG. 19 illustrates the binding of a functionalized carbon nanotube to substrate.
Figure 20:
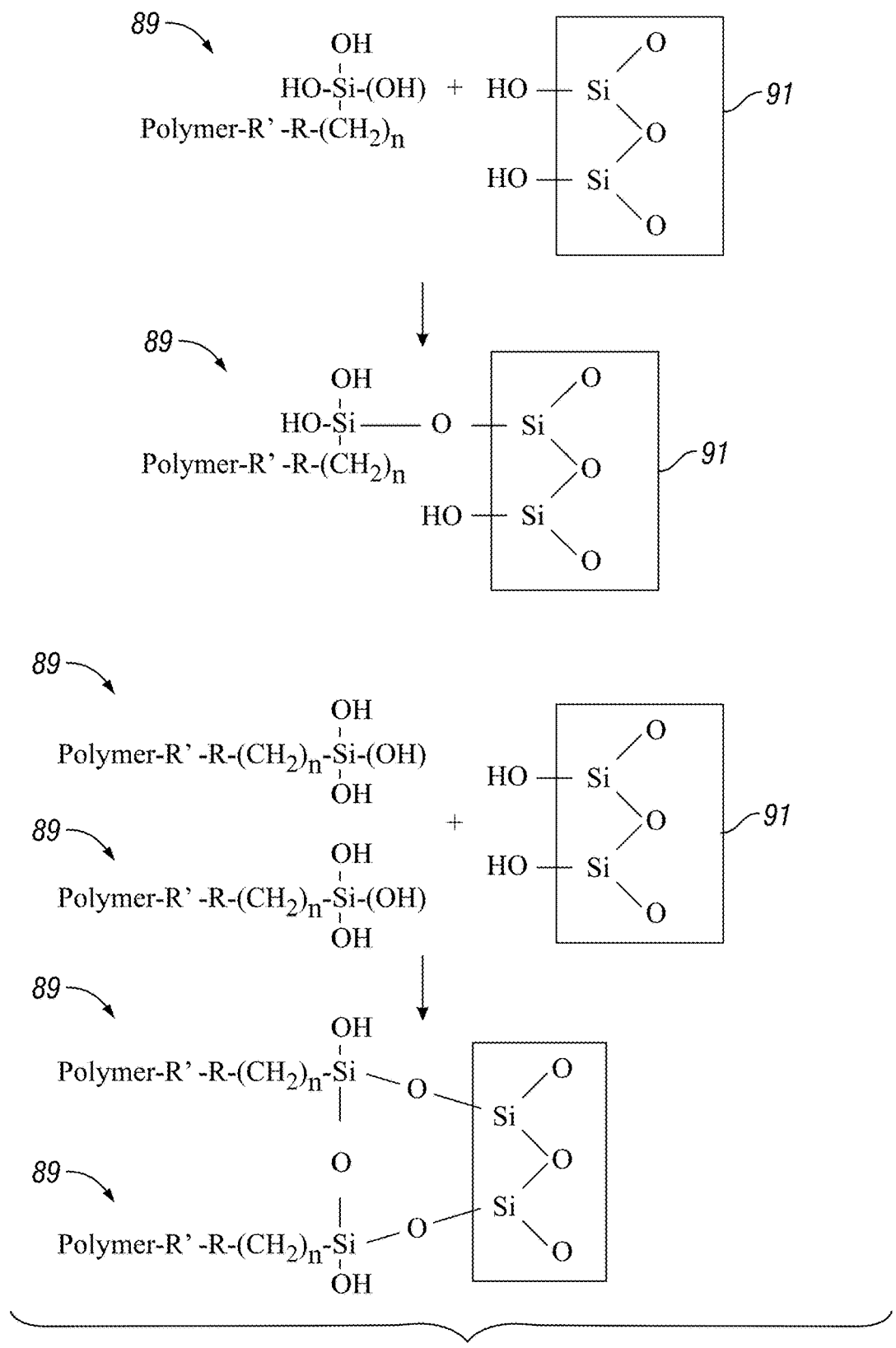
FIG. 20 illustrates the binding of a complex of polymer and silane to substrate.
Figure 22:
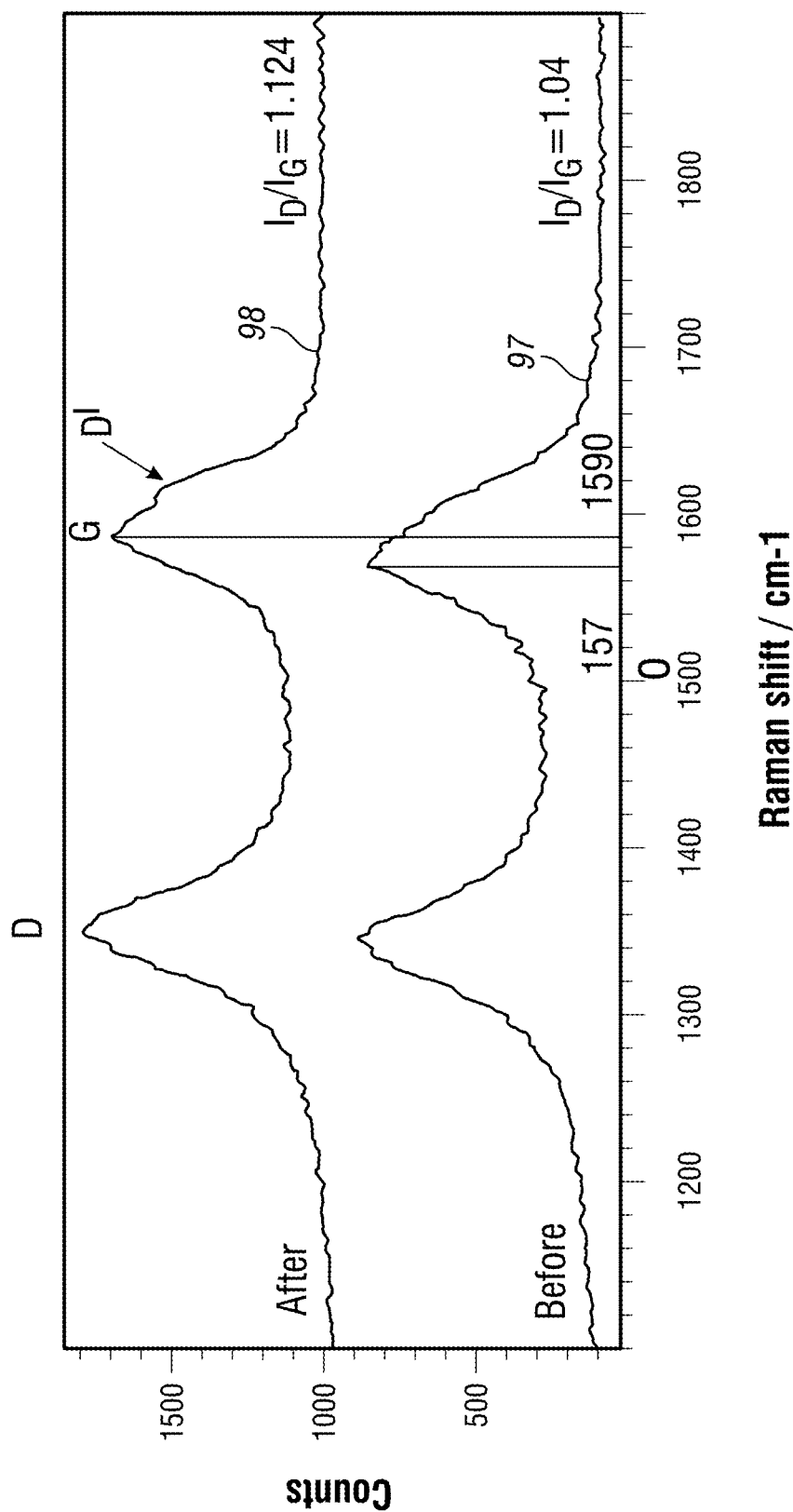
FIG. 22 illustrates the Raman spectra of carbon nanotubes in Examples 17-20 before and after surface modification.
Figure 23:
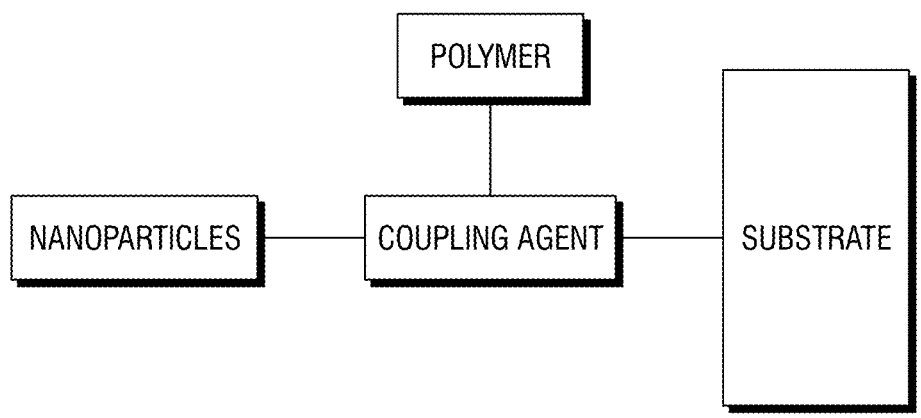
FIG. 23 is a schematic of the reaction of at least one embodiment of the composition with glass or ceramic substrate.

Nanoparticles can be thermally treated, chemically treated or both and are either functionalized prior to or during mixing. Some of the as-received CNTs from manufacturers can contain impurities at a concentration from 4 to 20%. In at least one embodiment, the composition uses unpurified CNTs. In some embodiments, nanoparticles are chemically treated, thermally treated, or both before they are functionalized to rid the sample of impurities (e.g. amorphous carbon, metallic impurities, volatile organic compounds) and to cause surface modification of the nanoparticles. FIG. 17 shows one example of the surface modification of nanoparticles (e.g. carbon nanotubes or CNT) in this case by a reaction with sulfuric acid and nitric acid 81 to modify the surface of the nanoparticles by attaching hydroxyl 83 and carboxyl 85 groups. As illustrated in FIG. 18, polymer 87 is added to a coupling agent (e.g. silane compound) 88 to produce a polymer silane complex 89 that combined with modified nanoparticles 85 generates a functionalized nanoparticle 90. FIG. 19 illustrates that the functionalized nanoparticles 90 bind to a substrate, thereby strengthening the substrate 91 while promoting adhesion. As illustrated in FIG. 20, the composition also strengthens a substrate and promotes adhesion because the functional complex 89 binds directly to a substrate 91 while binding other functional complexes. FIGS. 21A, 21B and 22 illustrate that the Raman spectra of nanoparticles gives a different reading after surface modification 96, 98 as compared to prior to surface modification 95, 97. FIG. 22 provides a schematic diagram of the chemical reaction depicted in FIG. 19. Other embodiments containing the other disclosed and claimed ingredients herein and/or prepared using the disclosed and claimed methods herein yield similar results with the disclosed and claimed substrates.

Other examples, embodiments and applications are set forth in the below examples.

Example 2 (Strengthening and Cleaning)

Example 1 can be modified by replacing a portion of the carrier liquid (water) with any number of cleaning solutions or ingredients. The mixture of strengthening and cleaning solutions adds multifunctionality to the composition. In some embodiments, off the shelf cleaners can be used or cleaning components can be added by adding cleaning ingredients such as soaps, bleach, ammonia, detergents, surfactants, de-greasing agents, acetic acid, baking soda, or other ingredients found in cleaners. FIG. 11 shows the results of strength testing of glass (ASTM C1499) treated with Example 1 modified to substitute some of the base liquid water with Windex 50 and treated with Example 1, 52, as compared with untreated glass 54. Glass treated with Windex modified composition 50 proves stronger than untreated glass 54 and also yields the benefit of cleaning.

Example 3 (Fast Curing Time)

This embodiment demonstrates the fast drying/curing adhesion promoting characteristics of some embodiments when applied to film and glass or other materials. 15 mil PET security film was cut into 15 inch by 3 inch strips and placed on 12 inch long, 3⅜ inch wide and ¼ inch thick glass panels using in some cases the composition of Example 1 and in other cases soap and water. In a fast curing scenario, film placed on the glass immediately after application of the composition in Example 1 sets within 2 hours. Samples using soap and water have not set in that period of time. Separately, 90 degree and 180 degree peel tests were conducted seven (7) days after sample preparation. As shown in FIGS. 13 and 14, the peel strength is approximately 100% better in the 90 degree peel test and approximately 200% better in the 180 degree peel test for the film and glass treated by the composition 58, 62 in Example 1 than that treated by soap and water 60, 64.

Example 4 (XDCNT)

In this embodiment, XDCNT is used as the nanoparticle type with the Base Solution of Example 1. 1-1500 mg of XDCNT is mixed with one (1) gallon of the Base Solution of Example 1. Such a composition demonstrated a 51% improvement in lightbulb drop tests and 146% and 237% improvements in 90 and 180 degree peel tests, respectively. XDCNTs are a nanotube mixture of approximately one-third single-walled carbon nanotubes (SWCNTs), one-third double-walled carbon nanotubes (DWCNTs), and one-third multi-walled carbon nanotubes (MWCNTs).

Example 5 (Silica Particles)

In this embodiment, silica nanoparticles are used as the nanoparticle type with the Base Solution of Example 1. 1-1500 mg of silica nanoparticles is mixed with one (1) gallon of the Base Solution in Example 1. Light bulb drop test results show a thirty percent (30%) improvement for treated light bulbs as compared to untreated lightbulbs.

Example 6 (Graphene Oxide)

In this embodiment, graphene oxide nanoparticles are used as the nanoparticle type with the Base Solution of Example 1. 1-1500 mg of graphene oxide was mixed with one (1) gallon of the Base Solution in Example 1. Light bulb drop test results show a forty percent (40%) improvement for treated light bulbs as compared to untreated lightbulbs.

Example 7 (Accelerated Curing Via Heat Treatment)

In this embodiment, a film and glass assembly treated with the composition of Example 1 undergoes accelerated drying/curing at elevated temperatures. 8 mil PET security film is cut into 15 inch by 3 inch strips and placed on 12 inch long, 3⅜ inch wide and ¼ inch thick glass panels that had been treated with the composition of Example 1. The film is put in place immediately and sets in less than 2 hours. Afterwards, the samples are heated at a moderately elevated temperature (30-90° C.) for 0.5-2 hours to accelerate drying/curing. 90 degree peel test and 180 degree peel test were conducted afterwards. FIGS. 15 and 16 show 90 degree 65, 67, 69, 71 and 180 degree peel strength 73, 75, 77, 79, respectively, which are an improvement over the same Madico 15 mil film-glass assembly treated with soap and water, FIG. 13, 60, and FIG. 14, 64.

Example 8 (Solvent-Based Formula)

This embodiment uses, largely instead of water, a solvent based composition comprised of 0.001-10% coupling agent, a solvent, and a small amount of water. 0.001-10% by volume percent of, for example, 3-glycidyloxypropyltrimethoxysilane is mixed with 90-99.99% by volume percent alcohol (methanol, ethanol, or isopropyl alcohol) and 0-10% by volume percent distilled water. 0.001-5% by volume percent of a binder (including but not limited to vinyl acetate monomer, polyvinyl acetate, acrylic polymer) was added after 24 hours. The resulting composition can be used to clean the substrate such as glass as well as strengthening glass and as an adhesion promoter. The light bulb drop test shows a 36% improvement for treated bulbs. The ASTM C1499 test shows a 33% improvement for treated ¹⁄₁₆ inch thick annealed glass.

In examples 9-16, the composition of Example 1 was modified by adjusting the coupling agent and nanoparticles along with the method of preparation, including sonication to optimize the effectiveness of the composition.

Example 9

This embodiment differs from Example 1 in that Example 1 is prepared by adding binder followed by MWCNT to Part A Solution while this Example 9 is prepared by adding MWCNT followed by binder to Part A Solution. Example 9 further differs in that it uses sonication. To a designated amount of (in one embodiment) 600 ml of Part A Solution (with 83.33 µl of binder added), 0.1-5 mg of nanoparticles (MWCNTs from Southwest NanoTechnologies) was added and processed with a Cole-Palmer 750 Watt Ultrasonic Homogenizer with a ½ inch probe set at 34% amplitude for 10-60 minutes. The bulb drop test showed an improvement in impact strength (height of drop) of up to 60% for treated bulbs as compared to untreated bulbs.

Example 10

In this embodiment, the composition of Example 9 was modified by adding 0.1-5 ml of additional coupling agent (1.67 ml of 3-glycidoxypropyltrimethoxysilane) to 600 ml of the composition of Example 9 (hereinafter referred to as the composition of Example 10). The bulb drop test showed improvement in the impact strength of treated bulbs of up to 45% in comparison to untreated bulbs. For this example, different coupling agents can be added so that a mix of coupling agents is used.

Example 11

This embodiment uses the composition of Example 10 except for the doubling of the coupling agent (3.34 ml of 3-glycidyloxypropyltrimethoxysilane added to 600 ml of the composition of Example 10). The bulb drop test showed an improvement of impact strength for treated bulbs of up to 50% in comparison to untreated bulbs. This type of improvement may be explained by a greater interaction between coupling agent and nanoparticles, given the greater concentration of coupling agent, as a result of the coupling agent binding directly with the substrate, FIG. 20, as a result of more than one monolayer of composition adhering to the substrate, or the result of greater active coupling.

Example 12

This embodiment uses the composition of Example 10 but with a tripling of the coupling agent (5 ml of 3-glycidoxy-propyltrimethoxysilane added to 600 ml of the composition of Example 10). Treated bulbs outperformed untreated bulbs in the bulb drop test by up to 50%. Examples 11 and 12 can be used to "repair" a composition, by renewing its potency, that has lost its effectiveness because of time or other factors according to the test data. This enhancement can be applied at a manufacturing center or in the field.

Example 13

This embodiment uses the composition of Example 9 but reduces the amount of nanoparticles in the composition, as compared to Example 9, by 20%. Treated bulbs outperformed untreated bulbs in the bulb drop test by up to 45%. This embodiment has the advantage of not requiring the decanting of residual nanoparticles.

Example 14

This embodiment uses the composition of Example 9 but reduces the amount of nanoparticles (MWCNT in this case) by 40%. Treated bulbs outperformed untreated bulbs in the bulb drop test by up to 40% in comparison to plain bulbs. This embodiment has the advantage of not requiring the decanting of residual nanoparticles.

Example 15

This embodiment uses the composition of Example 9 but reduces the amount of nanoparticles (MWCNT in this case) by 60%. Treated bulbs outperformed untreated bulbs in the bulb drop test by up to 30% in comparison to plain bulbs. This embodiment has the advantage of not requiring the decanting of residual nanoparticles.

Example 16

This embodiment uses the composition of Example 9 but reduces the amount of nanoparticle (MWCNT in this case) by 80%. Treated bulbs outperformed untreated bulbs in the bulb drop test by up to 40%. This embodiment has the advantage of not requiring the decanting of residual nanoparticles.

Examples 13-16 offer the following advantages by lowering the concentration of nanoparticles: lowering cost, greater effectiveness, easy to mix solutions, and solutions where less processing steps are used (no to little decanting).

Examples 17 to 20 subject nanoparticles to different treatments.

Purification by a thermal treatment is carried out by heating the dry nanoparticle MWCNT at 400-460° C. from 4-8 hours. Impurities are removed from the CNTs and less agglomeration occurs.

Purification by peroxide treatment is carried out by treating the dry nanoparticle MWCNT with 20-37% peroxide for 24-72 hours. This process removes impurities and leaves hydroxyl (—OH) groups on the CNTs, FIG. 17. This is a surface modification of the CNT and a step toward functionalization of the CNT.

Purification by acid treatment is carried out by treating the nanoparticle MWCNT with 8 N-12.1 N hydrochloric acid for 8-24 hours. This removes impurities (metallic particles). If sulfuric acid or nitric acid is used (in some cases together), impurities are removed and the CNTs are oxidized and surface modified with hydroxyl (—OH), and carboxyl (—COOH) groups, FIG. 17. This is a step toward functionalization of the nanoparticles.

These treatments help purify the nanoparticle MWCNT in addition to surface modifying them in preparation for functionalization. Other functionalizations may involve a coupling agent, a polymer ligament, and creation of free radicals or other reactive species. Functionalization of the surface modified MWCNT takes place in solution. FIG. 18.

Example 17

To 1 gallon of Part A Solution with 0.5 ml of binder added, 0.1-100 mg (50 mg) of peroxide treated nanoparticles (MWCNT) from one source (Southwest) and 0.1-10 ml (10 ml) of coupling agent (3-glycidoxypropyltrimethoxysilane) were added and magnetically stirred at speed 6-8 for 20-45 minutes (30 minutes). Treated bulbs outperformed untreated bulbs in the bulb drop test by up to 35%.

Example 18

This embodiment uses the composition of Example 17 but differs in that thermally treated nanoparticles (MWCNT) were used. Treated bulbs outperformed untreated bulbs in the bulb drop test by up to 25%.

Example 19

This embodiment uses the composition of Example 17 except that peroxide treated and then acid treated (two purification/surface treatment steps) nanoparticles (MWCNT) were used. Treated bulbs outperformed untreated bulbs in the bulb drop test by up to 30%.

Example 20

This embodiment uses the composition of Example 17 except that the nanoparticles (MWCNT) originated from another source (Aldrich) and were subjected to heat, peroxide and then acid treatment (three purification/surface treatment steps). Treated bulbs outperformed untreated bulbs in the bulb drop test by up to 40%.

What is claimed is:

1. A composition comprising:
   90-99.99% by volume liquid;
   0.001-10% by volume hygroscopic lubricant;
   0.001-10% by volume coupling agent;
   0.001-10% by volume solvent;
   0.001-5% by volume surfactant;
   0.001-5% by volume binder; and
   0.00001-5% by volume nanoparticles dispersed throughout the composition, wherein said nanoparticles have been treated with chemicals that are 0.001-20% by weight of said nanoparticles.

2. The composition of claim 1 wherein said liquid is non-aqueous.

3. The composition of claim 1 wherein said liquid is water.

4. The composition of claim 1 wherein said hygroscopic lubricant is also a preservative.

5. The composition of claim 1 wherein said hygroscopic lubricant is a polyol.

6. The composition of claim 1 wherein said coupling agent is a silane or a phosphonate.

7. The composition of claim 1 wherein said solvent is selected from the group consisting of alcohol, toluene, hexane, and dimethylformamide.

8. The composition of claim 1 wherein said liquid is alcohol and said solvent is distilled water.

9. The composition of claim 1 wherein said binder is a polymer.

10. The composition of claim 1 wherein said binder is selected from the group consisting of acrylic emulsion, vinyl acetate monomer, polyvinyl acetate, acrylic polymer, polyurethane, polyurea, polycarbonate, poly(methyl methacrylate) (PMMA), acrylonitrile butadiene styrene (ABS) polymer, cellulose acetate butyrate, glycol modified polyethylene terephthalate (PET), and epoxide.

11. The composition of claim 1 wherein said binder is a silica additive.

12. The composition of claim 1 wherein said nanoparticles are selected from the group consisting of carbon nanotubes, boron nitride nanotubes, graphene, graphene oxide, graphene as flakes or ribbons, 2D nanoparticles, hexagonal boron nitride as flakes or ribbons, calcium carbonate, boron silicate, alumina, silica, polyhedral oligomeric silsesquioxane, nanoclays and other ceramic and inorganic nanoparticles.

13. The composition of claim 1 wherein said nanoparticles are ceramic nanoparticles comprising color centers.

14. The composition of claim 1 wherein said chemicals comprise at least one of peroxide, hydrochloric acid, sulfuric acid, and nitric acid.

15. The composition of claim 1 wherein said nanoparticles have been thermally treated to remove impurities.

16. The composition of claim 1 wherein said nanoparticles are surface modified with at least one of hydroxyl groups and carboxyl groups.

17. The composition of claim 16 wherein said surface modified nanoparticles combine with said coupling agent and said binder to form functionalized nanoparticles.

18. The composition of claim 1 wherein: said liquid is water; said hygroscopic lubricant is glycerol; said coupling agent is 3-glycidyloxypropyltrimethoxysilane; said solvent is isopropyl alcohol; said surfactant is sodium dodecylbenzenesulfonate (SDBS); said binder is acrylic emulsion; and said nanoparticles are multi-walled carbon nanotubes.

19. The composition of claim 1 further comprising at least one of a UV blocker, a defoamer, a cleaner, and a dye.

20. The composition of claim 1 further comprising a substrate comprising one or a plurality of layers of material that have been treated with said composition to form a laminate.

21. A composition comprising: liquid; hygroscopic lubricant; coupling agent; solvent; surfactant; binder; and nanoparticles dispersed throughout the composition, wherein said coupling agent is a phosphonate.

22. A composition comprising:
90-99.99% by volume liquid;
0.001-10% by volume hygroscopic lubricant;
0.001-10% by volume coupling agent;
0.001-10% by volume solvent;
0.001-5% by volume surfactant;
0.001-5% by volume binder; and
0.00001-5% by volume nanoparticles dispersed throughout the composition,
wherein said liquid is water; said hygroscopic lubricant is glycerol; said coupling agent is 3-glycidyloxypropyltrimethoxysilane; said solvent is isopropyl alcohol; said surfactant is sodium dodecylbenzenesulfonate (SDBS); said binder is acrylic emulsion; and said nanoparticles are multi-walled carbon nanotubes.

* * * * *